United States Patent Office 3,548,487
Patented Dec. 22, 1970

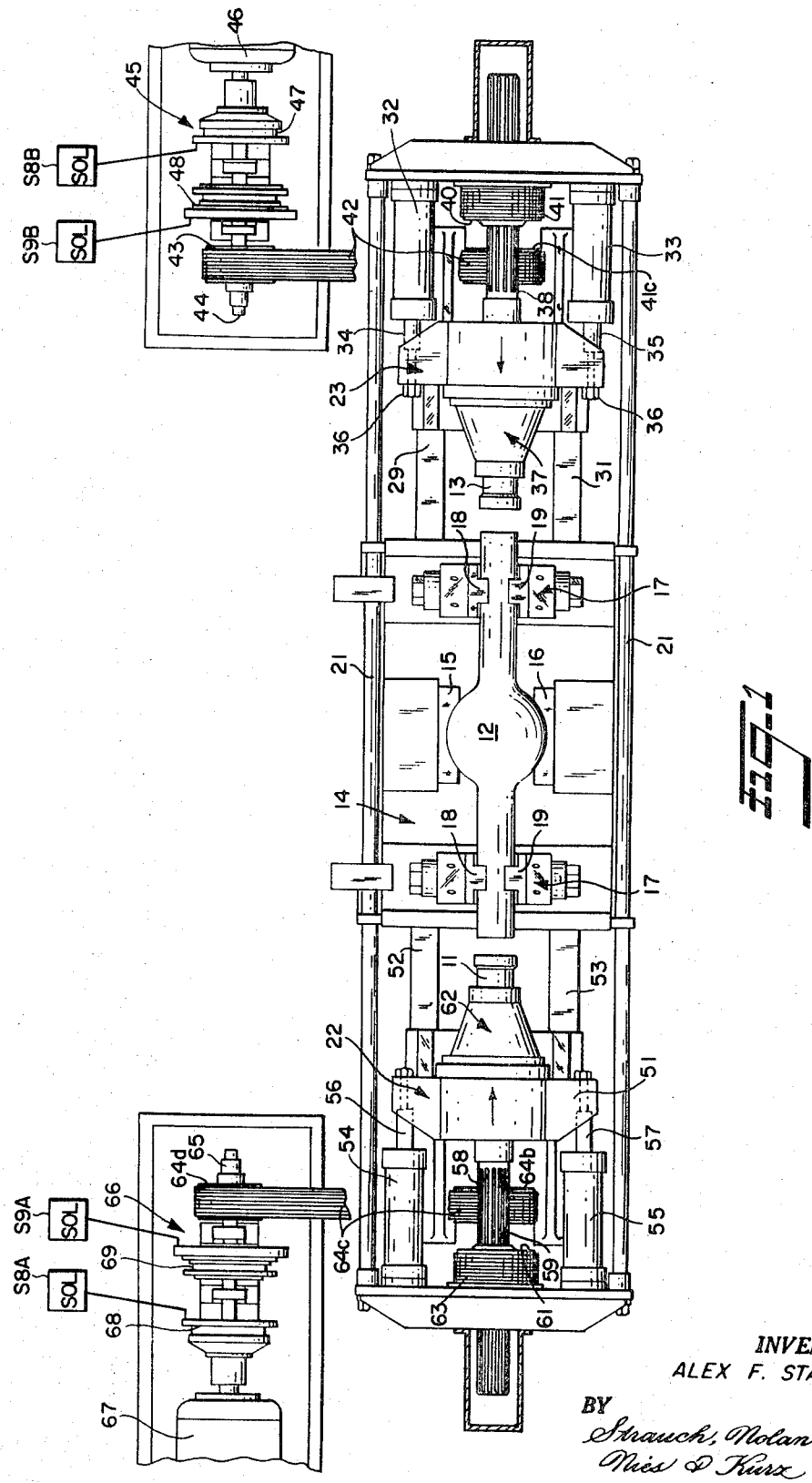

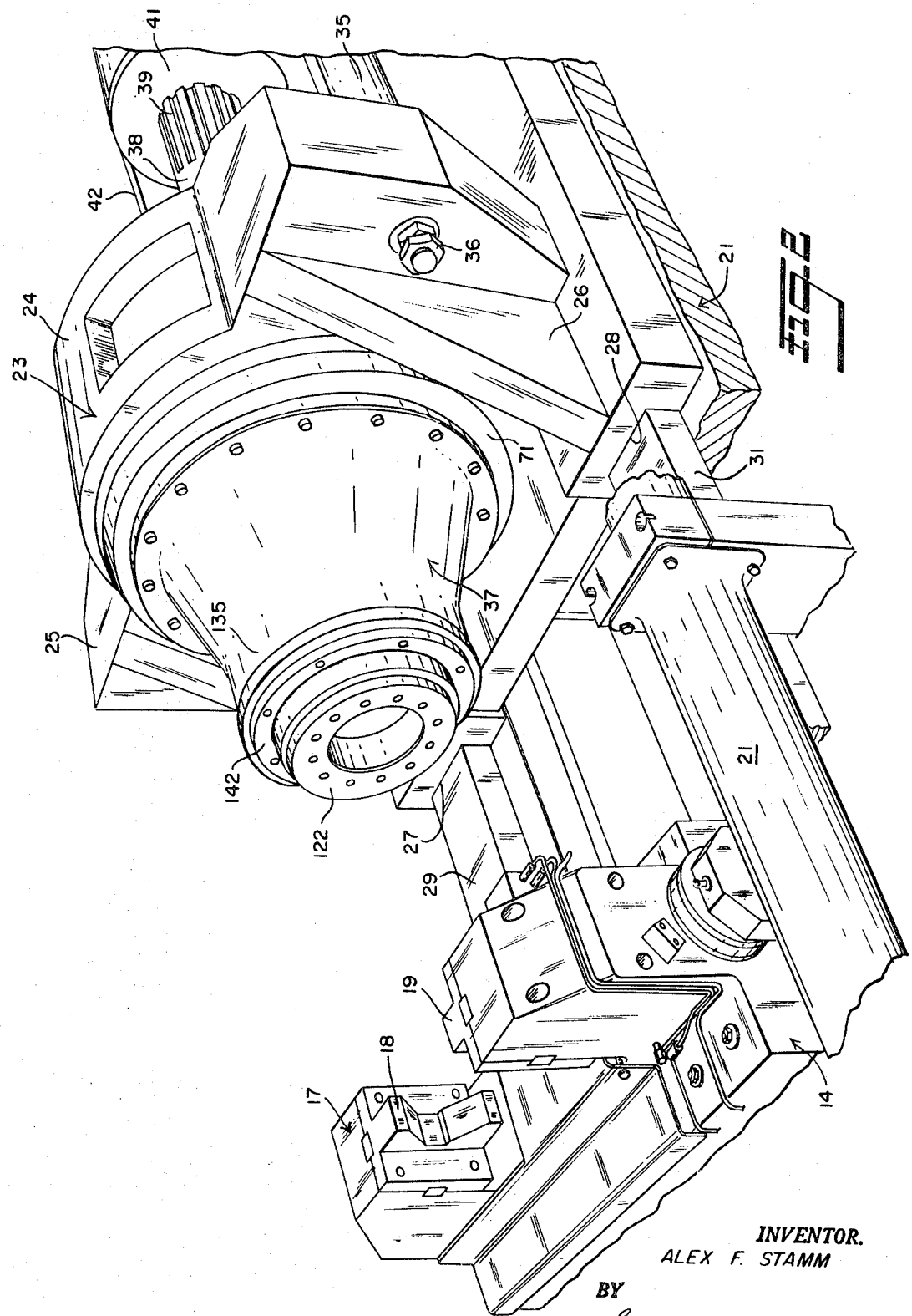

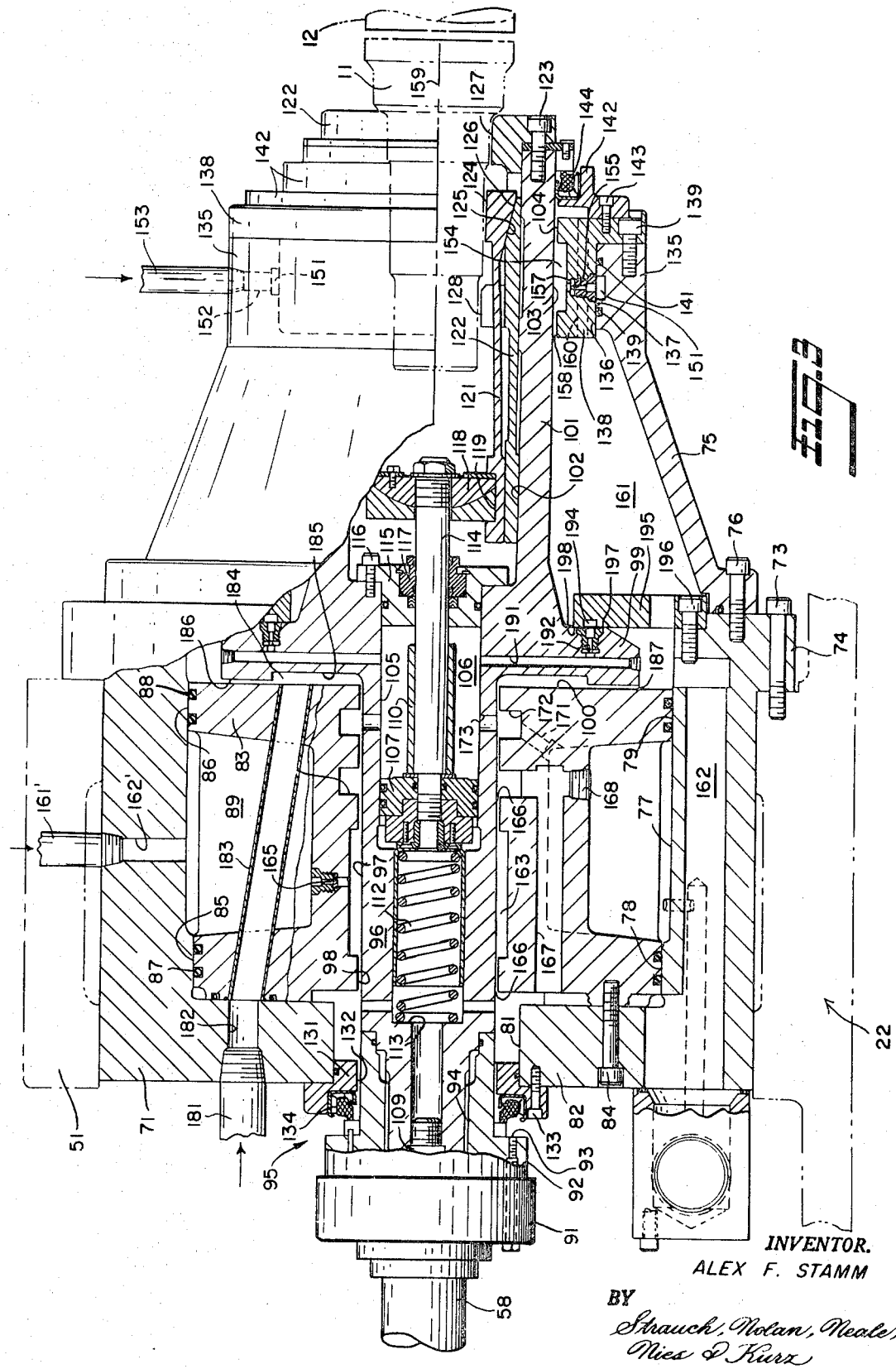

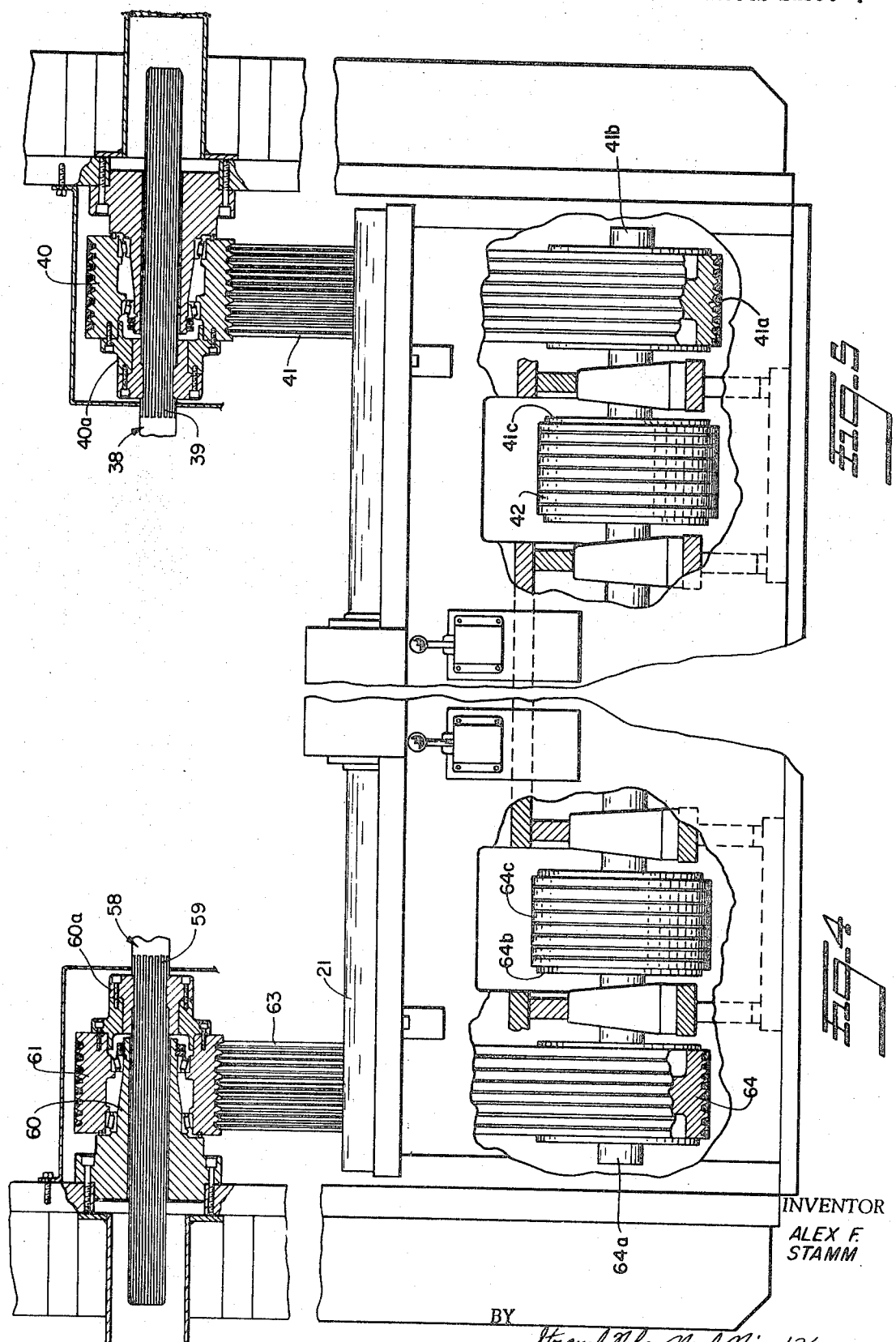

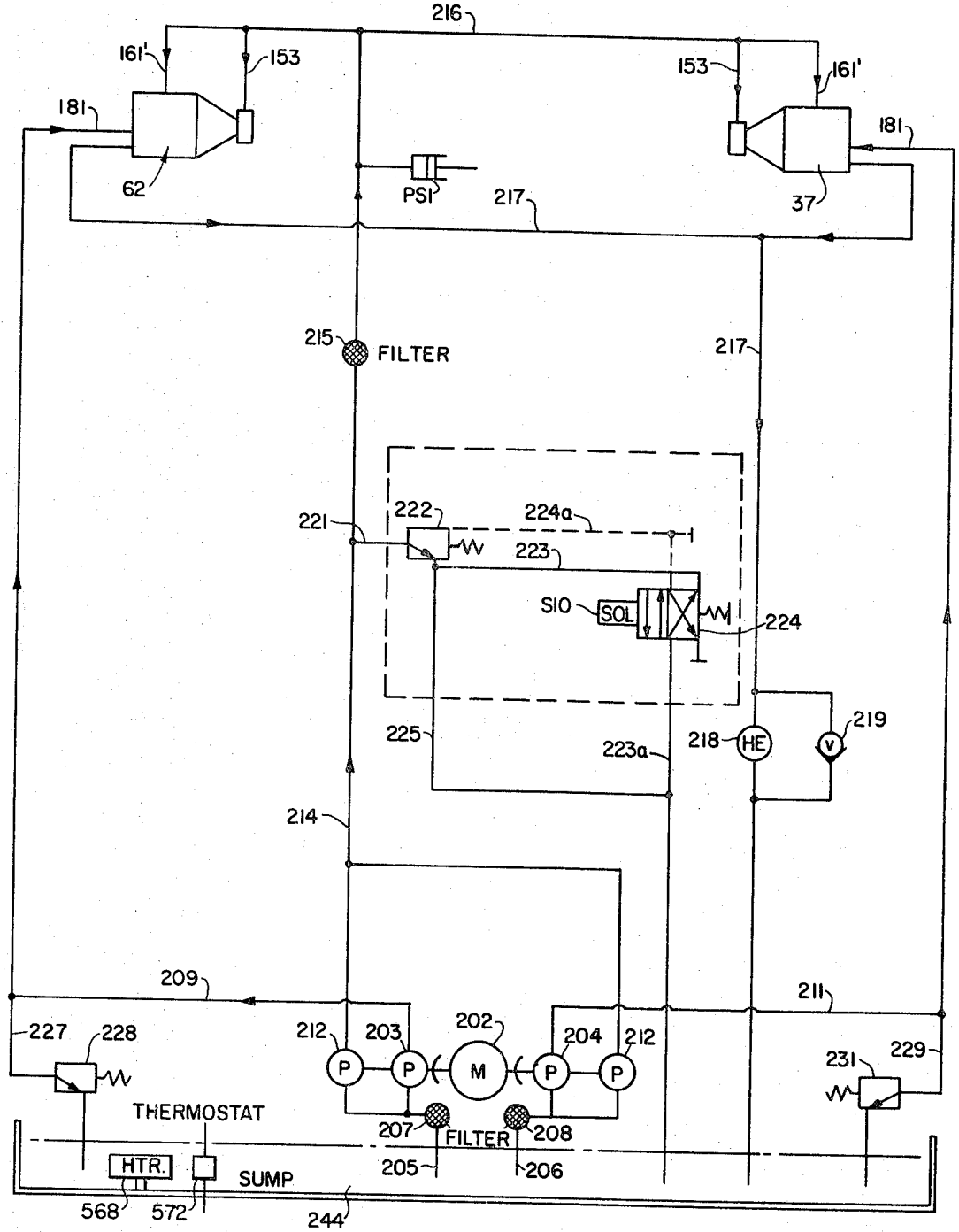

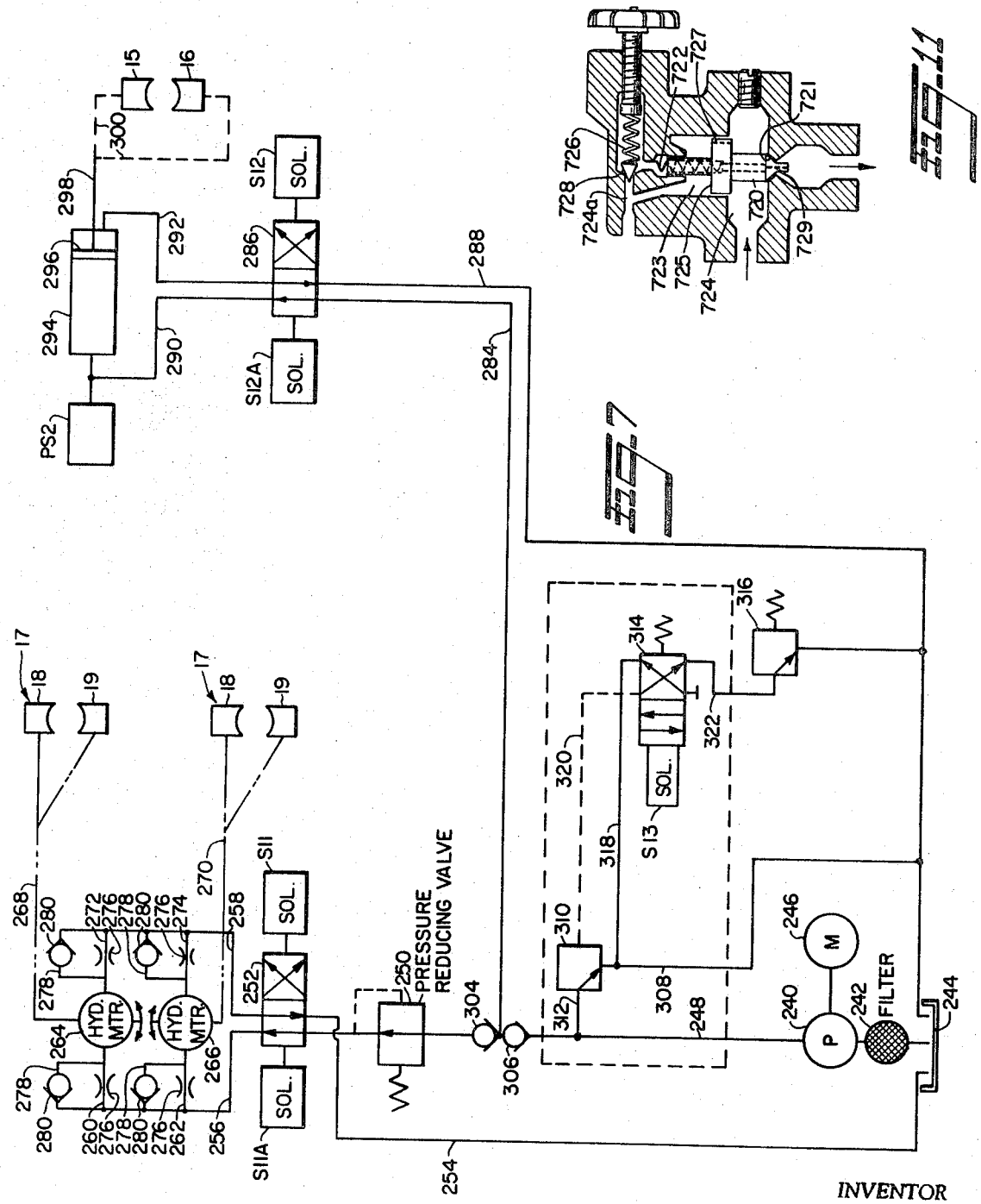

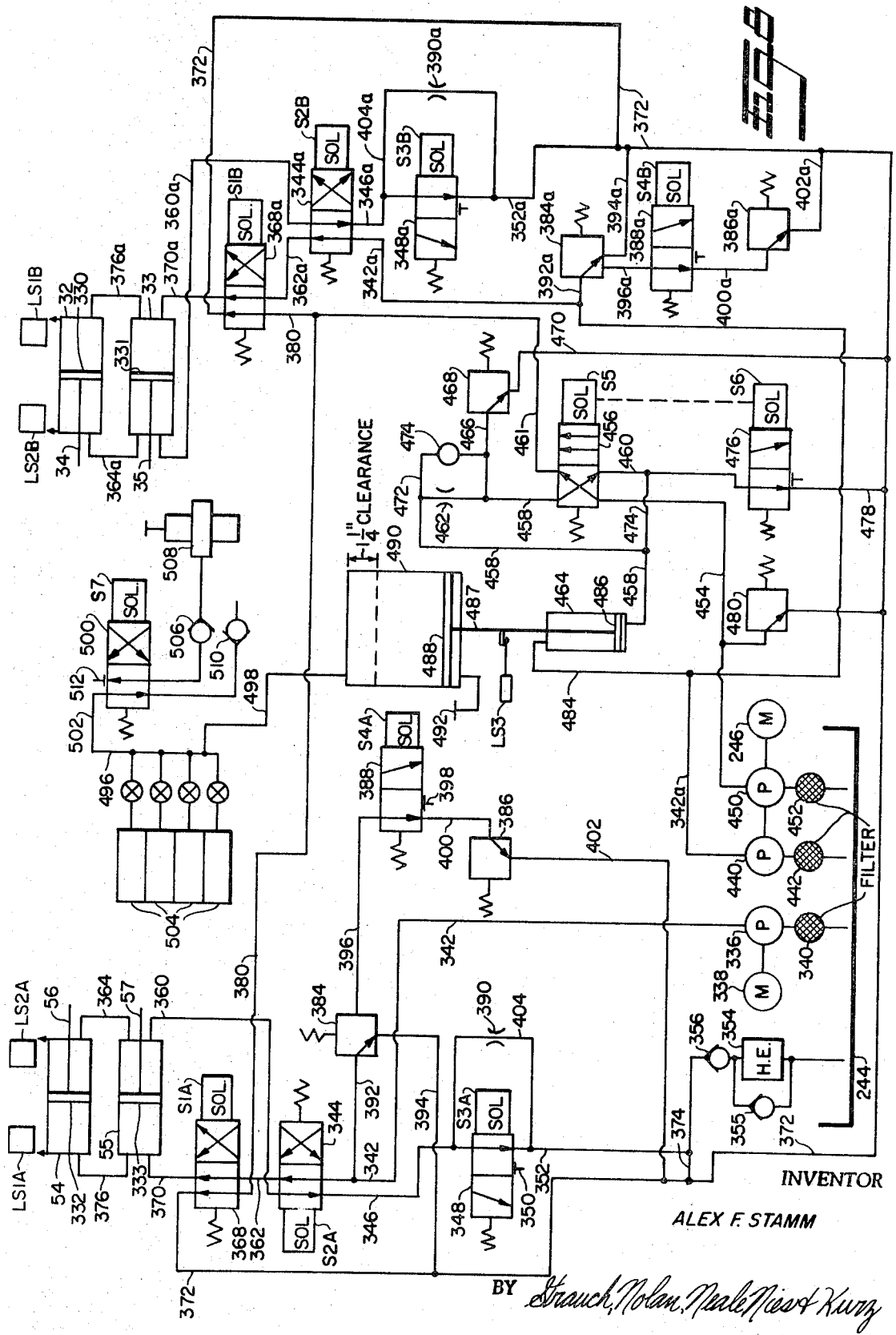

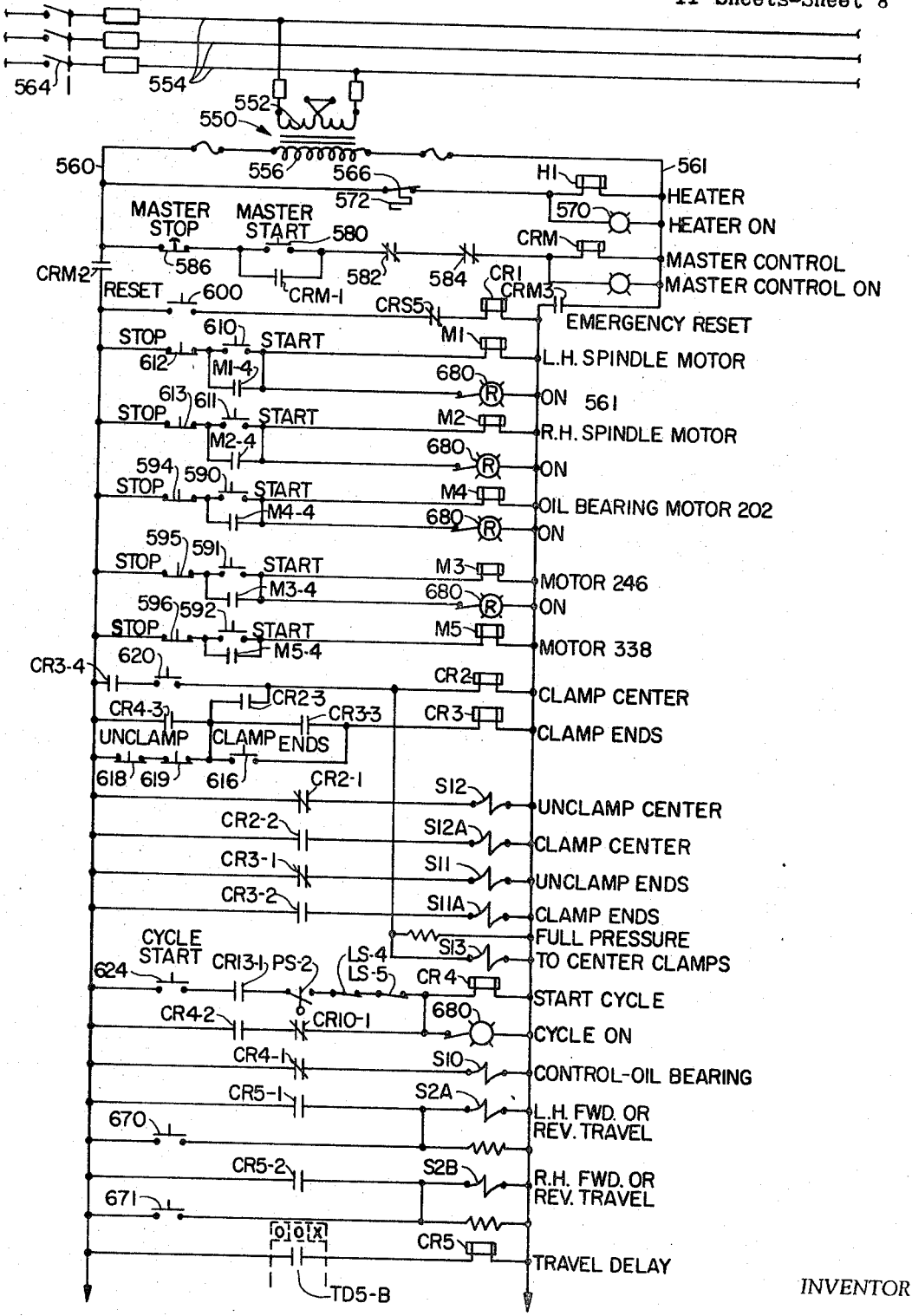

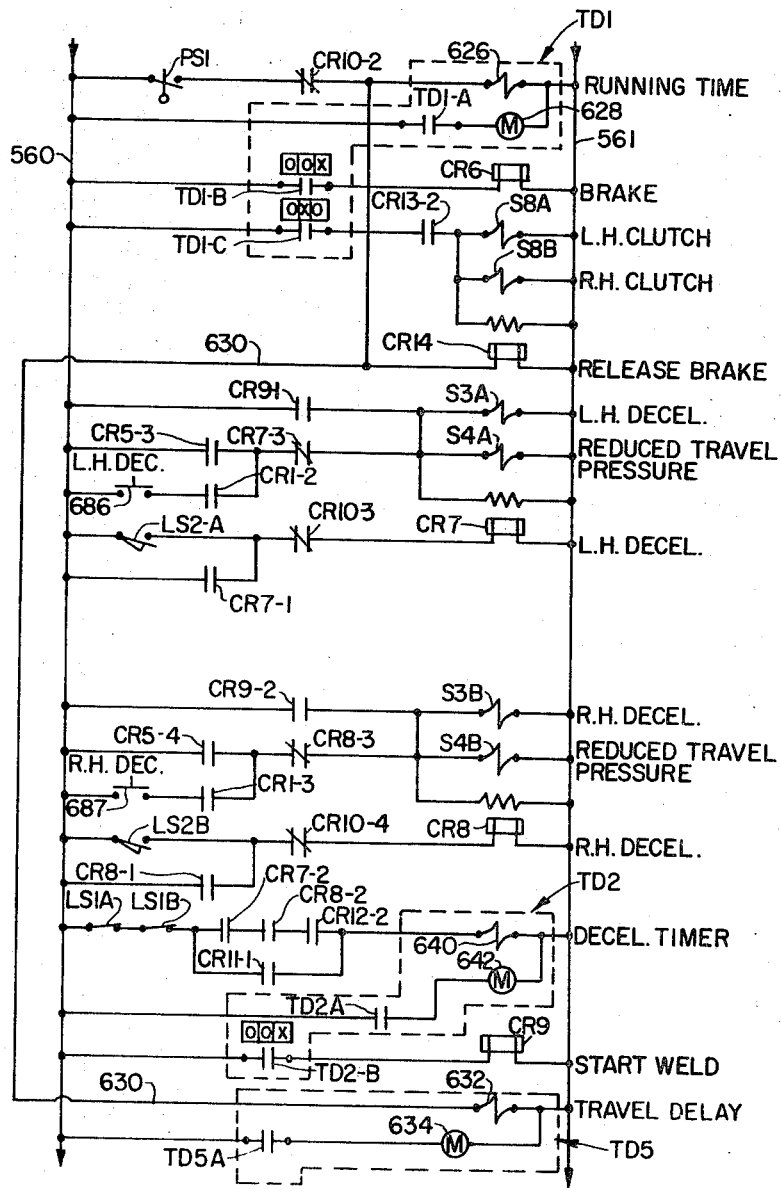

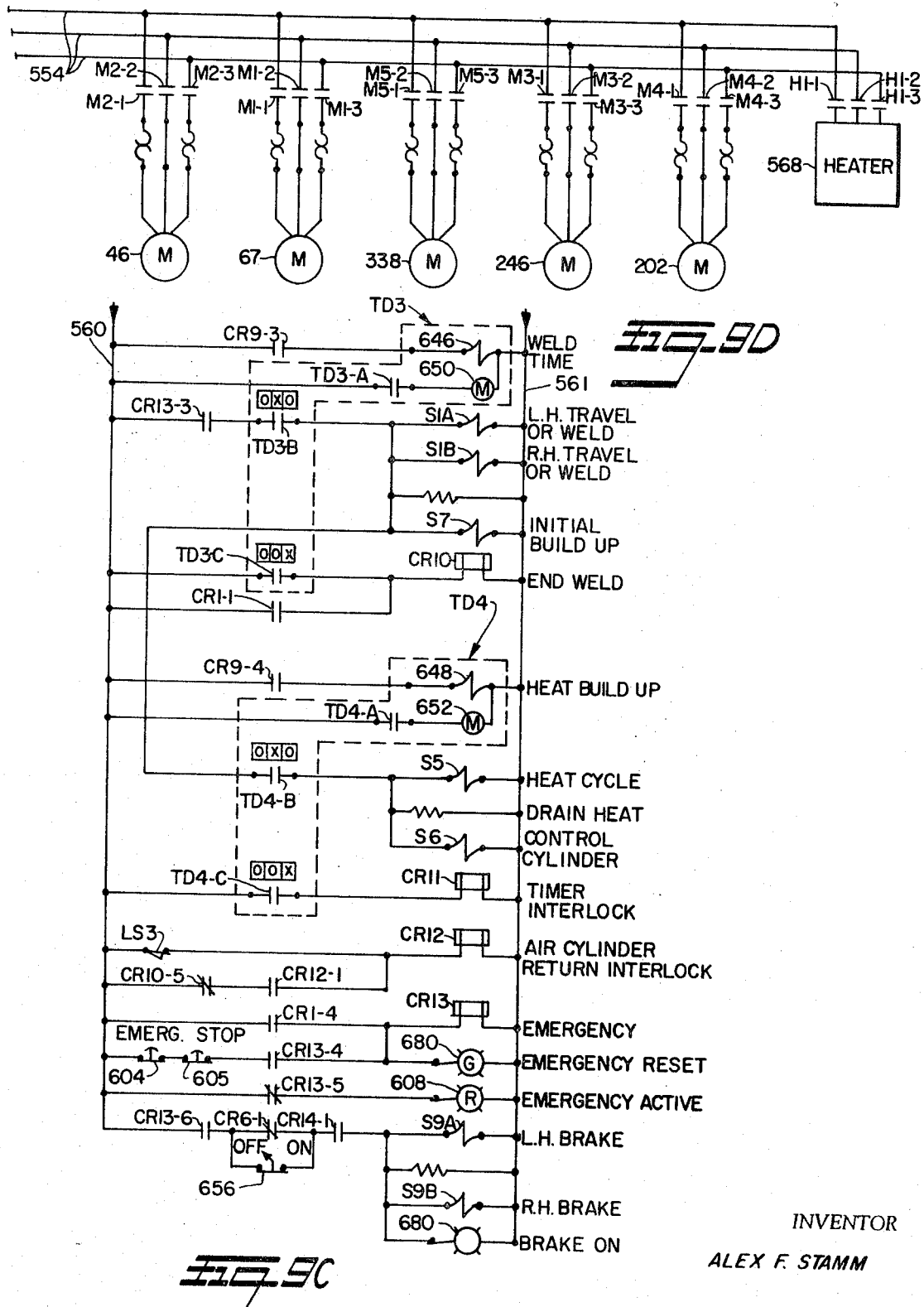

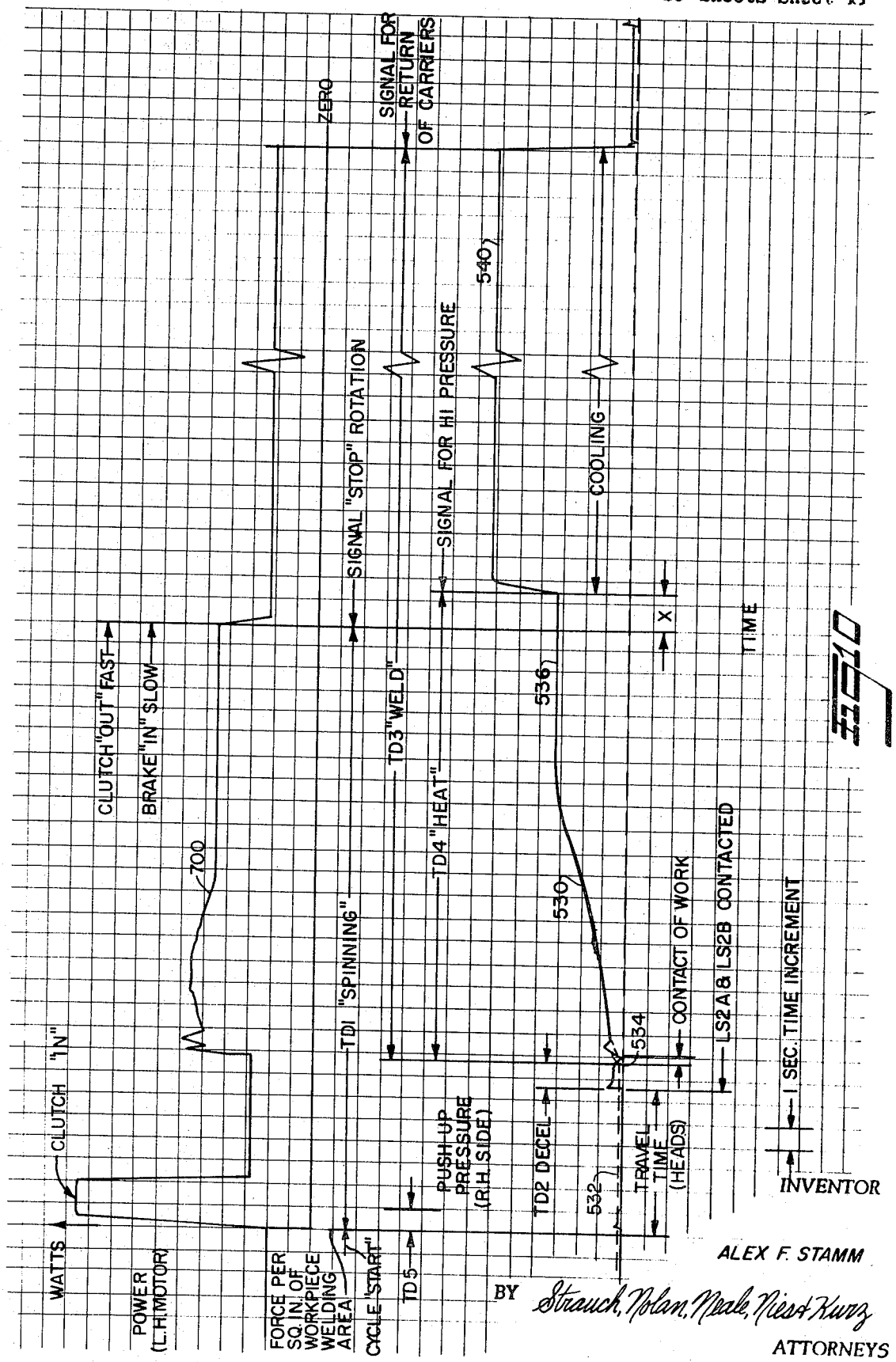

3,548,487
METHOD AND APPARATUS FOR FRICTION WELDING
Alex F. Stamm, Rochester, Mich., assignor, by mesne assignments, to Rockwell-Standard Corporation, a corporation of Delaware
Filed June 30, 1967, Ser. No. 650,396
Int. Cl. B23k 27/00
U.S. Cl. 29—470.3                                   33 Claims

ABSTRACT OF THE DISCLOSURE

A friction welding apparatus and method wherein workpieces such as the center section and wheel bearing end spindles of a drive axle housing are frictionally welded together by rotating the end spindles and axially accelerating the rotating end spindles towards opposite ends of the center section, decelerating the advancing end spindles as they approach the center section so that they gently contact the center section, abruptly and materially increasing the axial thrust urging the rotating end spindles against the center section immediately upon contact, then gradually increasing the axial thrust applied to the rotating end psindles from the abruptly increased thrust level, stopping rotation of the end spindles, and abruptly increasing the axial thrust again to a much higher level and holding the axial engagement pressure at this last level until the welds, which are formed when the end spindles stop rotating, have cooled.

FIELD OF INVENTION

This invention relates to an apparatus and method for friction welding workpieces together. The invention is particularly adapted for the friction welding of relatively heavy workpiece such as, for example, the parts of an axle drive housing.

BACKGROUND AND SUMMARY OF INVENTION

The present invention constitutes an improvement over conventional friction welding machines by providing welds of improved strength, by shortening the time needed to complete the weld, and by providing for an improved control of the sequence of steps necessary to friction weld two or more workpieces together.

Prior to this invention, friction welds produced by conventional means were of poor strength and quality particularly owing to the presence of oxidized material in the weld. This is avoided in the present invention particularly by the timing of the various steps in the welding sequence and by abruptly increasing the axial engagement thrust of the spinning workpiece against the stationary workpiece substantially immediately upon engagement of the spinning workpiece with the stationary workpiece to minimize the effects of battering.

According to this invention, each spinning workpiece is rapidly accelerated toward the stationary workpiece to shorten the welding cycle time and, as it approaches the latter, it is decelerated to gently contact the stationary workpiece. Accurate control of the sequence of welding cycle steps is achieved by providing two independent timing systems in an automatic operation. In one system the spinning time is adjusted to allow for acceleration of the rotating mass, the approach travel of the rotating workpiece, and the desired interval of rubbing contact. Deceleration of the axially advancing, rotating workpiece starts the second timing system which controls the engagement pressure.

A major object of this invention, therefore, is to provide for a novel friction welding apparatus and method.

A more specific object of this invention is to provide a novel friction welding apparatus and method wherein the axial engagement pressure applied to the rotating workpiece is abruptly and materially increased substantially immediately upon engagement of the rotating workpieces against the stationary workpiece.

Another object of this invention is to provide a novel friction welding apparatus and method wherein the rotating workpiece is rapidly accelerated towards its welding position and is decelerated as it approaches the stationary workpiece so that it gently contacts the stationary workpiece without rebounding.

Still another object of this invention is to provide a novel friction welding apparatus and method wherein automatic control of the welding cycle is obtained with two indepednent timing systems, one providing for the spinning time and the other providing for the pressure cycle.

Further objects of this invention will appear as the description proceeds in connection with the appended claims and annexed drawings wherein:

DESCRIPTION OF DRAWINGS

FIG. 1 is a top plan view illustrating the arrangement of parts in apparatus incorporating a preferred embodiment of the invention;

FIG. 2 is a generally perspective view showing a workpiece carrier unit from the apparatus of FIG. 1;

FIG. 3 is an elevation partly broken away and in section showing structural details of the unit of FIG. 2;

FIG. 4 is an enlarged, partially sectioned, fragmentary elevation of the outboard end of the right-hand bearing unit and illustrates details of the belt and pulley motor-driven connection for rotating a workpiece carried by the unit;

FIG. 5 is an elevation similar to FIG. 4 and illustrates the outboard end of the left-hand unit of FIG. 1;

FIG. 6 is a diagrammatic view of the hydraulic circuit for the hydrostatic journal and thrust bearings in the two carrier units;

FIG. 7 is a diagrammatic view of the hydraulic circuit for clamping the center workpiece in place on the base of the welding machine;

FIG. 8 is a diagrammatic view of the main hydraulic circuit for advancing the end workpieces into contact with the center workpiece and for applying welding pressure to the end workpieces;

FIGS. 9A, 9B, and 9C diagrammatically illustrate the control and sequencing circuit for operating the apparatus, the circuitry in FIGS. 9B and 9C being continuations of the circuitry respectively shown in FIGS. 9A and 9B;

FIG. 9D illustrates the motor and heater circuits for this invention;

FIG. 10 is a graph showing the applied workpiece travel and engagement force and the resulting power consumed by the motor for the left-hand carrier of FIG. 1 throughout an entire welding cycle; and FIG. 11 is a cross section illustrating details of one of the relief valves show in FIG. 8.

PREFERRED EMBODIMENTS

FIG. 1 illustrates a friction welding apparatus wherein three workpieces 11, 12 and 13 are adapted to be friction welded together. In this arrangement the central workpiece 12, which may be an axle housing center section, is held stationary and the other two workpieces, which may be wheel bearing end spindles 11 and 13, are rotated while being moved into contact with opposite ends of workpiece 12.

The central workpiece 12 is mounted in a cradle structure 14 wherein opposite sides are engaged and held suitably by adjustable jaws 15 and 16. The oppositely extending arms of workpiece 12 are clamped tightly in similar fixtures 17 each of which has opposed adjustable jaws indicated at 18 and 19 for gripping the workpiece. This arrangement supports and anchors workpiece 12 against rotation or axial displacement. Cradle 14 is secured rigidly to the machine base 21 during operation.

Workpiece 11 is mounted upon a hydrostatic bearing unit carrier 22 and workpiece 13 is mounted upon a similar hydrostatic bearing unit carrier 23 at opposite ends of base 21. These carriers 22 and 23 and the bearing units on them are essentially the same.

FIG. 2 shows carrier 23 as comprising an annular frame 24 having rigid side members 25 and 26 formed at their lower ends with parallel rectangular guideway grooves 27 and 28 respectively slidably fitting with parallel rails 29 and 31 on the machine base 21.

A pair of power cylinders 32 and 33, as best shown in FIG. 1, are fixed on base 21 with their piston rods 34 and 35 respectively projecting parallel and at the same level into rigid connection with carrier frame 24. Fasteners such as nuts 36 firmly secure piston rods 34 and 35 to frame 24. As will appear, introduction of fluid under pressure into both cylinders 32 and 33 will advance the carrier and the bearing uint cartridge 37 thereon toward the stationary workpiece 12.

As shown in FIG. 5, a shaft 38, located centrally of carrier 23 and midway between cylinders 32 and 33, has a splined section 39 which axially slidably extends through the hub of an axially stationary pulley 40. Pulley 40 is non-rotataby drive connected to shaft 38 through the splined drive connection provided by section 39 and a drive collar 40a. Collar 40a is fixed to pulley 40. A belt 41 is trained around pulley 40 and an idler pulley 41a. Pulley 41a is fixedly mounted on an idler shaft 41b that is suitably journalled for rotation about an axis extending parallel to and vertically below shaft 38. A pulley 41c is also fixedly mounted on shaft 41b as shown. A belt 42 (see FIGS. 1 and 5) connects pulley 41c to a pulley 43 on the output shaft 44 of a power assembly 45 consisting essentially of an electric motor 46 connected to shaft 44 through a clutch unit at 47 and having a braking unit associated therewith at 48.

Shaft 38 enters the hydrostatic bearing unit cartridge 37 and is adapted to be operably drive connected to the inserted workpiece 13 in a manner to be described shortly. By confining pulley 40 against axial displacement and by providing the splined drive connection between collar 40a and shaft 38, continuous rotation of shaft 38 need not be interrupted as the carrier is axially displaced along guide rails 29 and 31.

Similarly, housing carrier 22 is slidably mounted on the machine frame guide rails 52 and 53 which are in parallel alignment with rails 29 and 31, and displacement of carrier 22 is controlled by parallel cylinders 54 and 55 connected by piston rods 56 and 57 respectively to housing 51. A shaft 58 having a splined section 59 axially slidably extending through a pulley 61 extends into the bearing unit cartridge 62 to be connected, as will appear, to rotate workpiece 11.

Pulley 61 is rotatably mounted and confined against axial displacement on a fixed sleeve 60 in the same manner that pulley 40 is mounted on sleeve 40a. Pulley 61 is non-rotatably drive connected to shaft 58 through the splined drive connection provided by section 59 and drive collar 60a. Shaft splines 59 are slidable through the splined hub of collar 60a during operation so that drive to the pulley is not interrupted as carrier 62 moves along the support structure. Pulley 61 is connected by belt 63 to an idler pulley 64. Pulley 64 is fixedly mounted on an idler shaft 64a which is suitably journalled for rotation about an axis extending parallel to and vertically below shaft 58. A further pulley 64b, which is fixedly mounted on shaft 64a, is connected by a belt 64c to a pulley 64d.

Pulley 64d is mounted on an output shaft 65 of an independent power unit 66 that comprises an electric motor 67 connected to shaft 65 through a clutch 68 and having a braking unit associated therewith at 69.

The hydrostatic bearing unit cartridges 37 and 62 are preferably exactly alike, and similar reference numreals will be used for both. FIG. 3 shows internal details wherein the cartridge unit comprises a housing 71 that has a cylindrical periphery fitted snugly within the inner periphery 72 of frame 51. A series of machine screws 73 extend through a radial housing flange 74 to fix housing 71 to frame 51. A forwardly extending hollow conical nose portion 75 of the housing is secured to the housing by a row of screws 76 at flange 74.

Housing 71 is formed with a forwardly open relatively large diameter recess 77, and recess 77 is provided front and rear with axially spaced concentric cylindrical surfaces 78 and 79, surface 78 near the bottom of the recess being of slightly smaller diameter. Concentric with recess 77 is a smaller diameter bore 81 through rear wall 82 of the housing.

Within recess 77 a housing core section 83 is secured as by a series of machine screws 84 extending through wall 82. Core 83 is formed with cylindrical end surfaces 85 and 86 fitting snugly with recess surfaces 78 and 79 respectively, and resilient seal ring and groove arrangements indicated at 87 and 88 respectively provide static seals, whereby interiorly of the housing 71 an annular chamber 89 is defined between core 83 and the surrounding housing portion.

Power driven shaft 58 is connected to a coupling 91 which is secured to the end of a drive sleeve 92 by bolts 93. Sleeve 92 is non-rotatably mounted, as by splines at 94, on the end of a hollow arbor assembly 95. Arbor assembly 95 comprises a rear section 96 having a cylindrical surface 97 passing through a surrounding cylindrical bore 98 in core 83, a radially enlarged flange section 99 adjacent the flat core face 100 which is perpendicular to the arbor axis, and a forward section 101 having an internal cylindrical bore 102 and an outer cylindrical peripheral 103 surrounded by a cylindrical bore 104 on the front end of the housing nose 75.

As will appear, the arbor assembly is radially supported within the housing on hydrostatic bearing means effective between arbor sectiton 96 and bore 98 and between arbor section 101 and bore 104.

Arbor section 96 is enlarged internally at 105 to form a cylinder chamber 106 within which a piston 107 is slidably mounted. A compression spring 112 reacts between a radial wall 113 within the arbor and piston 107 to urge the piston to the right in FIG. 3.

A piston rod 114 fixed to piston 107 extends slidably through a collar 115 which is secured as by screws 116 to the flange section of the arbor to otherwise close the forward end of chamber 106. A suitable sealed bearing assembly indicated at 117 permits free sliding of rod 114 while maintaining fluid pressure in chamber 106. A spacer sleeve 110 on rod 114 limits forward displacement of piston 107.

At its forward end piston rod 114 is secured to a swivel coupling 118 peripherally engaged in internal annual grooves 119 on the rear end of a series of chuck elements 121 which in turn are axially slidably mounted on a chuck element 122 fixed as by screws 123 upon the arbor assembly. There are usually several chuck elements 121 equally circumferentially distributed about the workpiece.

The forward end of each chuck element 121 has an inner workpiece engaging surface 124 and an external generally conical contour forward inclined surface 125 that slidably engages a similarly inclined surface 126 on fixed clutch element 122. Fixed clutch element 122 has an internal annular workpiece engaging surface at 127, and a series of circumferentially spaced internal workpiece engaging surfaces 128 between which extend the movable chuck elements 121.

The chuck arrangement and structure shown in FIG. 3 is for holding axle spindles of the shape illustrated. The invention contemplates any equivalent chuck arrangement suited to the workpieces being welded.

In FIG. 3, piston 107 is shown displaced to its rearmost position by fluid pressure in chamber 106, and in that position it has displaced chuck elements 121 to the left whereby they ride up cam surfaces 126 to contract the chuck and peripherally grip workpiece 11 to lock it non-rotatably to the arbor assembly 95 concentrically on the axis of rotation of the arbor assembly. This condition exists during the friction welding operation as will appear.

The rear end of housing bore 81 contains a ring 131 the internal periphery 132 of which has free running clearance with the arbor. Collar 131 is secured to the housing as by screws 133 and mounts an annular axially resilient seal assembly 134 axially disposed between the stationary housing and the rotating arbor assembly. Thus no lubricant can escape axially through housing bore 81.

At the front end of the cartridge, housing member 75 terminates in boss 135 having a cylindrical bore 136 snugly receiving the cylindrical surface 137 of a bearing collar 138 secured to the housing as by screws 139. Bore 104 is formed on the inner periphery of collar 138. Static seal rings 139 and 141 are provided between surfaces 136 and 137.

At its forward end a ring 142 secured to collar 138 as by screws 143 mounts an axially resilient seal assembly 144 axially disposed between the stationary housing structure and the rotating arbor assembly. Thus no lubricant can escape through the front end of the housing.

An annular groove 151 is provided in surface 136 axially between the seal rings 139 and 141, and a radial inlet passage 152 extends outwardly from this groove to connect with a supply conduit 153. The internal surface 104 of bearing collar 138 is formed with an equally circumferentially spaced series of cavities 154 of the same size, and each cavity is connected to groove 151 by a radial passage 155 containing a sharp-edged calibrated, flow restricting orifice disc 157 of predetermined size. The diameter of cylindrical surface 104 is accurately machined a small amount larger than the diameter of cylindrical arbor surface 103.

Oil under high pressure enters passage 152 and distributes circumferentially around groove 151 from whence it is directed into cavities 154 through the orifice discs 157. Cavities 154 therefore are filled with the oil at a lower pressure than the supply pressure, and the difference in diameters of surfaces 103 and 104 provides gaps indicated at 158. Cavity oil leaking laterally through these gaps 158 flows directly and through drain holes 160 to enter a low pressure space 161 within the housing. From space 161, oil flows through passage 162 back to the sump. The external oil circuit will be described in connection with FIG. 6.

Thus, with the arbor assembly rotating about its axis indicated at 159, its forward end is radially supported by the high pressure oil circulating in the cavities 154 and gaps 158 and there is no metal to metal contact at surfaces 103 and 104. The foregoing constitutes the front hydrostatic journal bearing in the assembly.

Still referring to FIG. 3, an oil supply conduit 161' enters a housing passage 162' opening into chamber 89. The housing core 83 is formed around its internal periphery with a series of spaced cavities 163 each of which is connected to chamber 89 by calibrated, accurately sized, restricted sharp-edged orifice discs.

Cylindrical surface 97 is of slightly smaller diameter than internal cylindrical surface 98 of the housing core. The incoming oil maintains high pressure in cavities 163 to provide balanced support of the arbor during rotation. The gaps 166 that exist between concentric surfaces 97 and 98 provide relief passages between the cavities and at the sides as indicated in FIG. 3 to discharge oil into a core passage 167 through which oil flows back to the sump. Communication between passage 167 and chamber 89 is blocked by plug 168.

The foregoing provides a second hydrostatic journal bearing for the arbor assembly.

As shown in FIG. 3, chamber 89 is connected by a core passage 171 to an annular recess 172 in surface 98, and oil from recess 172 flows through a plurality of openings 173 in the arbor to enter piston cylinder 106. Oil under pressure in cylinder 106 forces piston 107 to the left to its workpiece clamping position. Thus oil in the bearing assembly circuit must be pressurized before the workpiece 11 can be secured non-rotatably to the arbor.

An oil supply conduit 181 is connected by a core passage 182 to one end of a conduit 183 extending longitudinally of core 83 to open into a relatively shallow annular chamber 184 defined by annular recess 185 in the rear face of arbor flange 99 and the flat front face 100 of the core. Radially outwardly of chamber 184 the arbor flange is formed with an annular flat face 186 that is closely adjacent and parallel to core face 100 so as to define a restricted passage gap indicated at 187 through which oil from chamber 184 flows to lower pressure passage 162.

Gap 187 functions to provide a thin band of oil between surfaces 100 and 186, thereby providing a rear hydrostatic thrust bearing preventing metal to metal contact between arbor surface 186 and housing surface 100 even under the very heavy axial pressures encountered during friction welding.

Oil under the pressure of cylinder 106 also enters a plurality of radial passages 191, and one or more of these passages 191 is connected by a sharp-edged, calibrated orifice disc 192 providing a restricted entrance that opens into an annular groove 194. Groove 194 is formed in a fixed ring block 195 secured to the housing by screws 196. Oil under pressure is thus delivered through orifice 192 to the annular interface between the front surface of flange 99 and the housing and this provides a front hydrostatic thrust bearing preventing metal to metal contact between flat annular face 197 on the arbor and flat face 198 on the housing.

The foregoing structure is disclosed and claimed in detail in my copending application Ser. No. 650,505 filed on even date herewith for Friction Welding Apparatus. Reference is made thereto in the event further details are needed for an understanding of the invention disclosed herein.

Referring to FIG. 6, the oil sump is indicated at 244. An electric motor 202 drives two similar constant or fixed displacement pumps 203 and 204 to withdraw oil through conduits 205 and 206 and filters 207 and filters 208 respectively. Pumps of this type, as is we known, provide a constant rate of flow.

Pump 203 delivers oil to conduit 209 that is connected to conduit 181. Conduit 181, as shown in FIG. 3, leads into hydrostatic bearing unit cartridge 62 for supplying oil to the rear hydrostatic thrust bearing there. Similarly, pump 204 delivers oil to conduit 211 connected to the conduit 181 leading into hydrostatic bearing cartridge 37 for supplying oil to the rear hydrostatic thrust bearing there. Since pumps 203 and 204 are of the fixed displacement type, the oil pressure at the thrust bearings will be dictated by applied load. The operating thrust bearing oil pressure operating range may vary from 50 to 2000 p.s.i. during operation.

A separate fixed displacement pump 212 driven by motor 202 supplies oil to all of the hydrostatic journal bearings. Outlet conduit 214 from pump 212 delivers oil through a filter 215 to a line 216 that connects to both conduits 153 and 161' of both hydrostatic bearing cartridges. Conduit 214 is also connected to a pressure switch PS1 which is disposed in the main control ciricut for the welding apparatus, and this switch will be open whenever the pressure in line 214 drops slightly below a pre-set operating pressure. When oil comes up to operating pressure, switch PS1 is actuated to allow the welding cycle to be started. Cartridges 37 and 62 have a common drain line 217 connected to passages 162 for returning oil back to the sump after passing through the thrust and radial bearings. A heat exchanger 218 is provided in return line 217 as it is preferable to cool the oil to a suitable temperture for optimum viscosity, about 110° F., when passing through the bearings. A check-valved bypass 219 is provided around the heat exchanger, and it will permit return flow of oil should the heat exchanger become blocked.

Since pump 212 is of the fixed displacement type, it, together with relief valve 222, provides a fixed pressure source, and the pressure differential across the various orifices such as orifices 157 and 165 will depend upon the journal load.

A branch line 221 connected to conduit 214 is connected to the inlet port of relief valve 222 which delivers oil from conduit 214 to line 225 leading directly back to sump 44. This permits a controlled bypass circulation of oil without passing it through the journal bearings and thereby maintains the oil pressure supplied through line 214 at a predetermined magnitude.

As shown in FIG. 6, a four-way, solenoid-operated valve 224 has an operating port connected by a conduit 223 to conduit 225. Conduit 223a connects an outlet of valve 224 to conduit 225. When the solenoid S10 of valve 224 is de-energized, as when the welding apparatus controls are operated for starting a weld cycle, valve 224 is shifted to its illustrated position to block flow through an oil vent passage 224a. This allows the oil pressure to be maintained at a higher limit under the control of valve 222 as compared with the limit that the oil pressure that is maintained when valve 224 is shifted to the right where it allows oil to flow through passage 224a to the sump. When solenoid S10 is energized, relief valve 222 bypasses the discharge of pump 212 through conduit 225 at substantially atmospheric pressure. The assembly of valves 222 and 224 is conventional and may be manufactured as a single unit such as the Vickers Co. CT5–06–1A–C20 valve unit. In such a valve unit, the pressure in the vent passage 224a between valves 222 and 224 is operative to control the throttling action of valve 222. Although this operation is known, it will be described more fully toward the end of this description.

When the solenoid of valve 224 is de-energized, flow rate into conduit 216 is increased and the pressure built up is sufficient to actuate switch PS1, allowing the welding cycle to be started. Valve 222 opens sufficiently to prevent the oil pressure from exceeding a suitable operating pressure (such as 1500 p.s.i.g.). When the solenoid of valve 224 is energized, valve 222 operates to limit the oil pressure to a maximum pressure which is significantly less than 1500 p.s.i.g. and which is insufficient to actuate switch PS1. This lesser pressure is slightly above zero p.s.i.g.

A branch line 227 connects conduits 209 to the pump through a pressure relief valve 228 which opens to limit the maximum pressure in conduit 209 to 2000 pounds per square inch and re-closes when the pressure drops below that amount. Similarly, a branch line 229 connects conduit 211 to a pressure relief valve 231 for the same purpose. These relief valves 228 and 231 may not be necessary as a practical matter in many installations because of the pressure relief available at the rear hydrostatic thrust bearings where the radial faces 100 and 186 will more closely approach each other when the thrust load increases ot automatically regulate the pressure.

In operation of the apparatus thus far described, the workpiece 12 is placed in stationary cradle 14 and clamped by jaws 15, 16, 18 and 19. The workpieces 11 and 13 are inserted into the open ends of the hydrostatic bearing cartridges, pistons 107 at this time being displaced into the forward positions as to the right in FIG. 3 by springs 112 so that chuck elements 121 have been forwardly displaced to loosely axially receive the workpieces. At this time the end faces of the workpieces to be friction welded together are axially aligned.

As will be described, motor 202 runs continuously during and between welding cycles and is thus operating when rotation of spindles 11 and 13 is started by motors 46 and 47 in the welding cycle.

Oil under pressure (about 1500 p.s.i.g.) is delivered to line 216 and therefrom to all four hydrostatic journal bearings. With reference to FIG. 3, the oil at line pressure from conduit 153 and passage 152 enters groove 151 which circulates it to simultaneously pass through the restricted orifice discs 157 into cavities 154, so that all of the cavities 154 solidly contain bodies of oil under pressure. Oil from the cavities also flows continuously back to drain through gaps 158 into passage 162.

The arbor assembly at the front end is therefore peripherally supported essentially by the pressurized oil bodies in cavities 154 out of metal to metal contact with internal surface 104 of the housing.

Oil from line 216 and 161' enters passage 162' to provide an annular body of oil in chamber 89 at pump pressure, and this chamber simultaneously supplies oil through all of the restricted orifice discs 165 into the cavities 163, whereby these cavities contain oil under pressure. Surfaces 97 and 98 are described for the front bearings. Oil from cavities 163 continuously flows through gaps 166 to the drain passage 162.

Since passage 171 conveys oil under pressure from chamber 89 to the cylinder 106, chuck elements 121 are displaced rearwardly in FIG. 3 to automatically clamp the workpiece 11 fixedly to the arbor assembly only when the radial bearings have been pressurized, and this takes place before the arbor assembly is rotated during the welding machine cycle. When the oil pressure drops in chamber 89 during the welding machine cycle, as when the solenoid for valve 224 is energized, the pressure in cylinder 106 drops to allow spring 112 to push the chuck elements forward to release the workpiece.

When the pressurized oil circuits for the radial journal bearings have been established, rotation is imparted to the arbor assemblies, and as the arbor assemblies come up to speed, the respective cylinders at 32 and 33 and 54 and 55 are operated to slide carriers 22 and 23 toward each other to frictionally engage the workpieces. Once these are engaged, the journal and thrust loads, particularly the latter, increase tremendously.

As the thrust increases the entire arbor assembly will tend to shift rearwardly relative to housing 71, to the left in FIG. 3. Rearward displacement of the arbor assembly results in restriction of the annular gap 187 between the flat parallel surfaces 100 and 186, to decrease the relief from chamber 184, and this results in oil pressure building up between pumps 203 and 204 and the respective chambers 184. The pumps are of such capacitiy as to be capable of developing counter pressures opposing the thrust up to 2000 p.s.i.g. in chamber 184, which in a friction welding apparatus for welding spindles of certain dimensions onto axle housings is adequate to oppose axial thrust up to 150,000 pounds at the welding joint.

Referring to FIG. 7, the hydraulic clamping circuit for the center clamp (jaws 15 and 16) and for both of the fixtures 17 is shown to comprise a suitable pump 240 having an intake port connected through a filter 242 to sump 244. Pump 240 is driven by a motor 246 to withdraw oil from sump 244 and to deliver it at a relatively high pressure to a conduit 248.

Conduit 248 is connected through a suitable pressure reducing valve 250 to an inlet port of a dual solenoid-operated four-way control valve 252. Valve 252 has an outlet port connected by a conduit 254 to sump 244.

Still referring to FIG. 7, valve 252 has two separate operating ports respectively connected to a pair of conduits 256 and 258. Conduit 256 is connected by branch conduits 260 and 252 respectively to separate reversible hydraulic motors 264 and 266.

Motors 264 and 266 are of the rotary type and may be of any suitable construction. Motor 264 is operatively drive connected by a suitable, schematically illustrated, motion transmitting chain drive 268 to jaws 18 and 19 of the left-hand fixture 17 as viewed from FIG. 1; and motor 266 is operatively drive connected by a similar motion transmitting chain drive 270 to the jaws of the right-hand fixture 17.

Motor 264 has a pair of operating ports respectively connected to conduit 260 and to a further branch conduit 272. Conduit 272 is connected to or forms a part of conduit 258 as shown. Motor 266 also has a pair of operating ports respectively connected to conduit 262 and to another branch conduit 274. Conduit 274 is connected to conduit 258. Each of the branch conduits 260, 262, and 272, and 274 contains an adjustable, variable orifice resistor 276 for controlling the rate of oil discharge from their respective hydraulic motors. Adjustment of restrictors 276 controls the speed of motors 264 and 266.

A bypass line 278 extending around each restrictor 276 contains a spring loaded check valve 280. Valves 280 block flow of oil back to valve 252, but allow oil at predetermined pressure to flow through the bypass lines toward the hydraulic motors.

A pair of solenoids S11 and S11A control the operation of valve 252. When solenoid S11 is energized, solenoid S11A is de-energized, and valve 252 is in its illustrated position where it connects conduits 256 and 258 respectively to conduits 248 and 254. In this position, motors 264 and 266 are driven in corresponding directions to move the jaws 15 and 16 of fixtures 17 to their clamping positions. When solenoid S11A is energized, solenoid S11 is de-energized, and valve 252 is shifted to its reversed position where it connects conduits 256 and 258 to conduits 254 and 248 respectively. As a result, motors 264 and 266 will each be driven in reverse directions to move the jaws 18 and 19 of fixtures 17 to their unclamped positions.

To operate the center clamp (jaws 15 and 16), a branch conduit 284 is connected to conduit 248 between pump 240 and valve 250. Conduit 284 is connected to the inlet port of a further dual solenoid-operated, four-way valve 286 having an outlet port which is connected by a conduit 288 to sump 244. Valve 286 has a pair of operating ports respectively connected to conduits 290 and 292.

Conduits 290 and 292 are respectively connected to opposite ends of a cylinder 294 which slidably receives a double-acting piston 296. Piston 296 is drive connected through a piston rod 298 and suitable motion transmitting drive 300 to jaws 15 and 16.

A pair of solenoids S12A and S12 control the operation of valve 286. When solenoid S12A is energized, solenoid S12 is de-energized, and valve 286 is shifted to its illustrated position where it connects conduits 290 and 292 respectively to conduits 284 and 286. In this position, oil delivered under pressure by pump 240 flows through conduit 290 to shift piston 296 to its right-hand position. Shifting piston 296 in this direction displaces jaws 15 and 16 to their clamping positions. Oil on the right-hand side of piston 296 will be exhausted to sump 244 through conduit 292.

When solenoid S12 is energized, solenoid S12A is deenergized, and valve 286 is shifted to its reversed position where it connects conduits 290 and 292 respectively to conduits 286 and 284. As a result, pump oil under pressure will be delivered through conduit 292 to shift piston 296 to its left-hand position, and movement of piston 296 in this direction displaces jaws 15 and 16 to their unclamped positions. Oil on the left-hand side of piston 296 will be exhausted to the sump through conduit 290.

A pair of spring loaded check valves 304 and 306 are provided in conduit 248. Valve 304 is between valve 250 and the connection of conduit 284 with conduit 248. Valve 306 is between pump 240 and the connection of conduit 248 to conduit 284. Valves both act in the same direction, allowing oil to flow away from pump 240, but blocking reverse flow toward the pump.

As shown in FIG. 7, a bypass conduit 308 is provided for circulating oil back to sump 244 without passing through valves 252 and 286 for operating motors 264 and 266 and piston 296. At its end remote from sump 244, conduit 308 is connected to the discharge port of a relief valve 310. The inlet port of valve 310 is connected by a conduit 312 to conduit 248 at a region that is between valve 306 and pump 240. Valve 310 cooperates with a solenoid-operated four-way valve 314 and further relief valve 316 to control the oil pressure which is maintained for clamping the ends and center of the axle housing section (workpiece 12) in a manner now to be described.

One operating port of valve 314 is connected to conduit 308 by a branch conduit 318. The other operating port of valve 314 is operatively connected by a pilot vent passage 320 to valve 310. One outlet port of valve 314 is connected by a conduit 322 to the inlet port of relief valve 316, and the remaining port of valve 314 is blocked. The outlet of valve 316 is connected to sump 244 as shown. Operation of valve 314 is controlled by a solenoid S13. As will be described in greater detail shortly, valve 310 is operated by shifting valve 314 to maintain either a relatively high clamping pressure or a relatively low clamping pressure.

The assembly of valves 310 and 314 and their arrangement with valve 316 is conventional. Valves 310 and 314 may be manufactured as a single unit such as the Vickers Co. model CT-5-06-1A-B-20.

When solenoid S13 is de-energized, valve 314 is spring biased to its illustrated position where passage 320 is connected to conduit 322 through one of the valve passages. Flow through the other valve passage is blocked as shown. When valve 314 is in this position, the pressure maintained by valve 310 is relatively low. In this embodiment, valve 316 is set to provide relief by circulating oil back to sump 244 for maintaining the oil pressure in conduit 248 at approximately 200 p.s.i.g.

Valve 250, according to this embodiment, is set to provide about a 50 percent reduction in pressure so that the pressure available for operation motors 264 and 266 and thus clamping the ends of the axle housing center section will be approximately 100 p.s.i.g. when solenoid S13 is de-energized.

Valve 304 prevents the hydraulic fluid from backing out of the hydraulic clamping circuit for fixtures 17 and thus prevents the jaws of fixtures 17 from relaxing. Valve 306 prevents hydraulic fluid from backing out of the hydraulic clamping circuits for jaws 15 and 16 and fixtures 17. In the event of pump or motor failure, therefore, the center clamp (jaws 15 and 16) and the end clamps (fixtures 17) are not relaxed.

According to one aspect of this invention, solenoids S11 and S11A are operated in the manner previously described to clamp and unclamp the ends of the axle housing center section when solenoid S13 is de-energized. The upper limit of the oil pressure available for clamping and unclamping the jaws 18 and 19 of both of the right-hand and left-hand fixtures 17 (as viewed from FIG. 1) is therefore under the control of valve 250 and is consequently relatively low.

This relatively low pressure is sufficient to hold the jaws of fixtures 17 to their clamping positions on opposite sides of the axle housing center section during the welding cycle. However, owing to a number of factors, a greater pressure is desired to ensure that the center clamp (jaws 15 and 16) firmly fixes the axle housing section in place on base 21 of the welding machine. This will prevent expansion and permanent set of the axle housing center section upon the application of the high welding force.

The increased pressure for clamping jaws 15 and 16 against the axle housing section is afforded by energizing solenoid S13 when solenoid S12A is energized. Energization of solenoid S13 shifts valve 314 to a position where the connections of conduit 318 and passage 320 will be reversed. Flow of oil through passage 320 will therefore be blocked, and the pressure maintained by valve 310 will be increased to a relatively high value. Thus a relatively high pressure may be applied to piston 296 to clamp jaws 15 and 16 against the center portion of the axle housing section. The operation of valve 310 in conjunction with valves 314 and 316 is described more fully near the end of the description.

When solenoid S13 is energized, the pressure on the downstream side of valve 250 is held at about 1000 p.s.i.g. to maintain the jaws of fixtures 17 firmly in their clamped positions. The end clamps provided by fixtures 17 are applied first at relatively low pressure, followed by clamping of the axle housing section with jaws 15 and 16 at relatively high pressure. Solenoids S11, S11A, S12, S12A, and S13 are controlled by an electrical sequencing circuit which will be described in detail later on. Motor 246 runs continuously during and between the welding cycles.

Referring now to FIG. 8, pistons 330, 331, 332, and 333 are slidable in cylinders 32, 33, 54, and 55 respectively and are respectively connected to piston rods 34, 35, 56, and 57. Oil supplied under pressure to the outboard (right-hand as seen from FIG. 8) ends of cylinders 32 and 33 displaces pistons 330 and 331 from right to left as viewed from FIG. 8 to advance carrier 23 in a corresponding direction. Oil supplied under pressure to the outboard ends of cylinders 54 and 55 displace pistons 332 and 333 from left to right as seen from FIG. 8 to advance carrier 22 in a corresponding direction. Under these fluid pressure conditions carriers 22 and 23 slide toward each other to frictionally engage the workpieces.

When oil under pressure is introduced into the inboard ends of cylinders 32, 33, 54, and 55, pistons 330-333 will be reversely displaced to slide carriers 22 and 23 away from each other and to their retracted positions shown in FIG. 1.

To supply oil under pressure to cylinders 54 and 55, a pump 336 of the variable positive displacement type is driven by a motor 338 and has its intake port connected through a filter 340 to sump 244. When motor 338 is energized pump 336 delivers oil under pressure to a conduit 342. Conduit 342 is connected to the inlet port of a spring-offset or spring-biased, solenoid-operated, four-way valve 344 which provides for the forward or reverse travel of carrier 22 in a manner to be described more fully later on.

The outlet port of valve 344 is connected by a conduit 346 to the inlet port of a solenoid-operated valve 348 which functions to decelerate piston displacement as will be described in detail shortly. Valve 348 has two outlet ports, one of which is blocked at 350 and the other of which is connected by a conduit 352 to the inlet side of a heat exchanger 354. The outlet of heat exchanger 354 is connected to sump 244. A spring loaded check-valved bypass line 355 is provided around heat exchanger 354 to circulate oil back to the sump without passing it through the heat exchanger in the event that the heat exchanger becomes clogged.

A spring loaded check valve 356 is disposed in conduit 352 between heat exchanger 354 and valve 348. Valve 356 maintains a pressure of about 50-75 p.s.i.g. in the low pressure, oil return conduit on its upstream side. This low pressure is maintained as a pilot source for the various solenoid-operated valves shown in FIGS. 7 and 8.

Still referring to FIG. 8, valve 344 is provided with a pair of operating ports which are respectively connected to conduits 360 and 362. Conduit 360 is connected directly to the inboard (right-hand) end of cylinder 55. Both inboard ends of cylinders 54 and 55 are interconnected by a conduit 364 so that oil introduced into the inboard end of cylinder 55 will be supplied to the inboard end of cylinder 54. Oil pressure acting to move pistons 332 and 333 in a reverse direction will therefore be substantially equal.

Conduit 362, as shown in FIG. 8, is connected to the inlet port of a further spring-offset or spring-biased, solenoid-operated, four-way valve 368. The purpose of valve 368, as will presently become apparent, is to control the delivery of oil under pressure for first advancing the end spindle 11 from its retracted position to contact the axle housing section and then to forcibly push the end spindle against the axle housing section for welding.

As shown, valve 368 has two outlet ports. One outlet port is connected by a conduit 370 to the outboard (left-hand) end of cylinder 55. The other outlet port is connected to a low pressure oil return conduit 372, which in turn is connected by a branch conduit 374 to conduit 352 between valve 356 and valve 348.

The outboard ends of cylinders 54 and 55, like the inboard ends, are interconnected by a conduit 376 so that oil introduced into the outboard end of cylinder 55 will also be supplied to the outboard end of cylinder 54 for applying substantially equal pressures to the corresponding faces of pistons 332 and 333. Solenoids S1A, S2A, and S3A respectively control operation of valves 368, 344 and 348.

To advance carrier 22 forwardly from its retracted position to a position where the end spindle 11 contacts the axle housing section, solenoids S2A and S3A are energized, and solenoid S1A is de-energized. When solenoid S2A is energized, valve 344 is shifted to its illustrated position where conduits 360 and 362 are respectively connected to conduits 346 and 342. When solenoid S3A is energized, valve 348 is shifted to its illustrated position where conduit 346 is connected to conduit 352. When solenoid S1A is de-energized, valve 368 is spring biased to its illustrated position where conduit 362 is connected to conduit 370. In this position, conduit 372 will be connected to another conduit 380 for a purpose to be explained later on in connection with the welding period.

Thus, with solenoid S2A energized and solenoid S1A de-energized, oil delivered by operation of pump 336 is supplied through conduits 342, 362, and 370 to the outboard end of cylinder 55; and oil from the outboard end of cylinder 55 will be supplied through conduit 376 to the outboard end of cylinder 54. Pistons 332 and 333 will thus be displaced to advance carrier 22 forwardly from its retracted position shown in FIG. 1 toward a position where spindle 11 contacts the axle housing section.

Oil on the inboard side of piston 332 will be exhausted through conduit 364 into the inboard end of cylinder 55 and oil on the inboard side of piston 333 in cylinder 55 will be exhausted serially through conduits 360, 346, and 352 to sump 244.

According to another important aspect of this invention, the advancement of carrier 22 in either its forward direction or its reverse direction may be accelerated to a relatively rapid speed and then decelerated to a much slower speed. This is accomplished, in brief, by selectively controlling the oil pressure applied to pistons 332 and 333 to advance them axially in either direction. Rapid travel can thus be imparted to carrier 22 by applying constant rate of flow to pistons 332 and 333 to advance the carrier from its retracted position shown in FIG. 1 to a position where the end spindle 11 approaches, but has not contacted the axle housing center section. At this point the oil pressure conditions in cylinders 54 and 55 may be changed in a manner to be described shortly to decelerate the rapidly advancing pistons to a much slower speed so that spindle end 11 is brought gently into contact with the axle housing center section. This prevents spindle end 11 from striking the axle housing center section with such force as to cause carrier 22 to rebound one or more times before movement is finally arrested. The relatively fast travel in advancing or jogging end spindle 11 through a large part of the distance that it must travel to contact the axle housing center section appreciably reduces the welding cycle time and thus increases the capacity of the machine.

Sudden contact resulting from rapid advancement of spindle end 11 into contact with the axle housing section could cause seizure at the workpiece welding surfaces and slippage of the workpiece in chuck elements 121 with the attendant risk of ruining the workpiece and stalling the motor. The deceleration and consequent gentle contact of end spindle 11, as accomplished in accordance with this invention, avoids these problems and assures smooth starting of the welding cycle.

After the weld is complete, carrier 22 may be moved back toward its retracted position at a relatively fast rate and then, as it approaches its retracted position, be decelerated to arrive gently at its withdrawn, final rest position, ready for re-loading to carry out another welding cycle. The time for successively welding a number of workpieces thus is further reduced.

To control the oil pressure conditions in cylinders 54 and 55 for attaining the rapid travel and deceleration of carrier 22, a pair of relief valves 384 and 386, a solennoid-operated valve 388, and a variable pressure and temperature compensated restrictor 390 are provided. As shown in FIG. 8, the inlet port of relief valve 384 is connected by a conduit 392 to conduit 342 between valve 344 and pump 336. The outlet port of valve 384 is connected by a conduit 394 to conduit 372.

A vent control passage 396 operatively associated with valves 384 and 388 is connected between a pilot valve (see FIG. 11) in valve 384 and valve 388. Valve 388 has two outlet ports, one of which is blocked as at 398, and the other of which is connected by a conduit 400 to the inlet port of relief valve 386. The outlet port of valve 386 is connected by a conduit 402 to conduit 372.

Restrictor 390 is disposed in a bypass conduit 404 which is connected between conduits 346 and 352. When valve 348 is shifted to its flow-blocking position, circulation of return oil is from conduit 346 through restrictor 390 to conduit 352.

Valves 384, 386, and 388 cooperate with each other in essentially the same manner as valves 310, 314, and 316 to hold either relatively high or low pressures in conduit 342 which is delivering oil at a constant flow rate to advance carrier 22 either in a forward direction or a reverse direction.

Valve 388 is operated by a solenoid S4A which, when de-energized, allows valve 388 to be spring biased to its illustrated position where it connects passage 396 to conduit 400. Under this condition, valve 384 provides relief to maintain the pressure in conduit 342 at approximately 100–125 p.s.i.g. by opening to allow a sufficient amount of oil being delivered by pump 336 to be bypassed back through conduit 372 to sump 244.

When solenoid S4A is energized, valve 388 is shifted from its illustrated position to its alternate position where flow through the valve is blocked at 298. Under this condition, valve 384 affords relief to hold the oil pressure in conduit 342 at approximately 200 p.s.i.g. by opening to allow a sufficient amount of pumped oil to be bypassed back through conduit 372 to sump 244.

It will be appreciated that the pressure of oil in cylinders 34 and 55 and in fluid communication with conduit 342 will be substantially equal to the oil pressure in conduit 342. The control of the maximum oil pressure provided by energizing and de-energizing solenoid S4A will therefore control the acceleration of pistons 332 and 333.

Valves 384 and 388 may be constructed as a single unit such as the Vickers Co. model CT5–10–1A–B–2D. Although this valve unit is conventional, a further detailed description of the unit is provided near the end of this description.

From the foregoing it is clear that when solenoids S4A and S2A are energized and when solenoid S1A is de-energized, oil will be supplied to the outboard ends of cylinders 54 and 55 at a relatively high pressure (200 p.s.i.g.). At this stage, solenoid S3A will also be energized to provide a relatively unrestricted discharge path for quickly exhausting the oil at the inboard sides of pistons 332 and 333. As a result, carrier 22 is advanced forwardly rapidly from its retracted position shown in FIG. 1.

As carrier 22 approaches the position where end spindle 11 is about to contact the axle housing center section, solenoids S4A and S3A are de-energized. As a result, relief valve 384 is rendered operative to limit the oil pressure applied to the outboard sides of pistons 332 and 333 to not more than the relatively low value of 125 p.s.i.g. for advancing the pistons forwardly at a fixed rate of speed. At the same time, de-energization of solenoid S3A allows valve 348 to be spring biased to its position where it blocks oil flow from conduit 346 to conduit 352. The oil being exhausted from the inboard ends of cylinders 54 and 55 consequently must flow through restrictor 390. This retards the rate of oil discharge from the inboard ends of cylinders 54 and 55 to thereby increase the back pressure acting on the inboard sides of pistons 332 and 333. This rapidly decelerates the forward advancement of carrier 22 to slow it down in a relatively short distance and thus allow spindle 11 to gently contact the axle housing center section without rebounding.

After the spindle end is welded to the axle housing center section and both workpieces are released, carrier 22 is withdrawn to its retracted position by de-energizing solenoid S2A, by placing solenoid S1A in its de-energized state (it will be energized during the welding period as will appear later), and by re-energizing solenoids S3A and S4A. De-energization of solenoid S2A connects conduits 360 and 362 to conduits 342 and 346. As a result, oil at a high flow rate and held at a pressure of approximately 200 p.s.i.g. by the relief valve throttling action is applied to the inboard faces of pistons 332 and 333, and the outboard ends of cylinders 54 and 55 are connected through valve 348 to sump 244 to rapidly advance carrier 22 rearwardly toward its retracted position.

As carrier 22 moves towards its fully retracted position, solenoids S4A and S3A are de-energized to reduce the flow rate into the inboard ends of the cylinders and to retard the rate of oil discharge from the outboard ends of the cylinders. The carrier 22 will rapidly be decelerated to come to a gentle stop at its fully retracted position shown in FIG. 1.

As shown in FIG. 8, the part of the hydraulic circuit just described for controlling the travel of carrier 22 is duplicated for carrier 23. This part of the hydraulic circuit which is duplicated comprises valves 344, 348, 368, 384, 386, and 388, restrictor 390, and conduits 342, 360, 362, 364, 376, 370, 346, 404, 392, 394, 400, and 402. The corresponding elements in the circuit for carrier 23 have been identified by like reference numbers suffixed with the letter a. Therefore, valves 344a, 348a, 368a, 384a, 386a, and 388a respectively correspond to valves 344, 348, 368, 384, 386, and 388; restrictor 390a corresponds to restrictor 390; and conduits 342a, 360a, 362a, 364a, 376a, 370a, 346a, 404a, 392a, 394a, 400a, and 402a respectively correspond to conduits 342, 360, 362, 364, 376, 370, 346, 404, 392, 394, 400, and 402.

The operating ports of valve 368a are respectively connected to conduits 372 and 370a as shown. Conduit 380 which is connected to one of the inlet ports of valve 368 is also connected to one of the inlet ports of valve 368a, the other inlet port of valve 368a being connected to conduits 362a. Conduit 352a is connected to conduit 372 for directing return low pressure oil to the sump through conduits 372 and 374. Conduits 402a and 394a are also connected to conduit 372 to return the oil to sump 244.

Solenoids S1B, S2B, S3B, and S4B, respectively control valves 368a, 344a, 348a, and 388a in the same manner that solenoids S1A, S2A, S3A, and S4A, respectively control valves 368, 344, 348, and 388.

Since the arrangement, construction and operation of the above circuit for controlling the forward and reverse displacement of carrier 23 is the same as that just described for carrier 22, further explanation concerning the operation of the hydraulic circuit for carrier 23 is not believed necessary.

It is to be noted that when solenoids S1A and S1B are deenergized to supply oil pressure to the outboard ends of cylinders 32, 33, 54, and 55 for advancing carriers 22 and 23 toward each other, the opposite ends of conduit 380 are respectively connected through 368 and 368a to conduit 372.

Still referring to FIG. 8, conduit 342a is connected to a separate pump 440. Pump 440 is connected through a filter 432 to sump 244 to supply oil under pressure for displacing carrier 23 forwardly and rearwardly in the manner described for carrier 22. Two completely independent hydraulic circuits are therefore provided: one for workpiece 11 and the other for workpiece 13, with each circuit imparting travel and weld engagement pressure to its associated workpiece. Pump 440 is driven by motor 246, which, as will be recalled, also drives pump 240. Pump 440 is of the fixed displacement type, but the displacement of the variable displacement pump 336, as previously described, is adjustable by an unshown control device. This is conventional. Adjustment of pump 336 ensures that spindle ends 11 and 13 contact the axle housing center section at substantially the same time where it is desired to simultaneously weld the spindle ends to the axle housing center section. Thus, although carriers 22 and 23 are advanced forwardly independently of each other by the independent operation of fixed displacement pumps 336 and 440, adjustment of the displacement of pump 336 correlates the timed arrival of the spindle end 13 with spindle end 11.

To apply a controlled axial pressure to spindle ends 11 and 13 during the welding cycle, a further fixed displacement pump 450, as shown in FIG. 8, has its intake port connected through a filter 452 to sump 244. Pump 450 is driven by motor 246 to deliver oil under pressure to a conduit 454. Conduit 454 is connected to an inlet port of a solenoid-operated four-way valve 456. Valve 456 has a pair of operating ports respectively connected to conduits 458 and 460 and an outlet port connected to a conduit 461.

Conduit 461 is connected directly to conduit 380 between valves 368 and 368a. Conduit 458 is connected through a restrictor 462 to one end of a pressure control cylinder 464. A branch conduit 466 is connected to conduit 458 between restrictor 462 and valve 456 and to the inlet port of a pressure relief valve 468. The outlet port of valve 468 is connected by a conduit 470 to conduit 372. A bypass conduit 472 containing a spring-loaded check valve 474 is connected to conduits 458 and 466 to allow oil to return from cylinder 460 without passing through restrictor 462.

Still referring to FIG. 8, conduit 460 is connected by a branch conduit 474 to conduit 458 between cylinder 464 and restrictor 462. Conduit 460 also is connected to an inlet port of a solenoid-operated valve 476 which has an outlet port connected by a conduit 478 to conduit 372.

A further pressure relief valve 480 has an outlet port connected to conduit 372. The inlet port of valve 480 is connected to conduit 454.

As shown in FIG. 8, the end of cylinder 464 remote from its connection to conduit 458 is connected by a branch conduit 484 to conduit 342a between pump 440 and valve 344a. Cylinder 464 slidably receives a piston 486 which is connected by a piston rod 487 to a piston 488. Piston 488 is slidable in an air pressure cylinder 490 which is vented at its piston rod end to atmosphere as indicated at 492. The opposite end of cylinder 490 is connected to a manifold 496 by a conduit 498. Manifold 496 is connected to an operating port of a solenoid-operated, four-way valve 500 by a conduit 502. Manifold 496 is connected to a series of separate tanks 504 which are used to vary the clearance volume above piston 488.

The inlet port of valve 500 is connected through a check valve 506 and a pressure regulating valve 508 to a source of pressurized air at about 100 p.s.i. Valve 506 permits air flow toward valve 500, but blocks air flow toward the pressure source. The outlet port of valve 500 is connected through a spring-loaded check valve 510 to atmosphere. Valve 510 is set to open at a low pressure of about 3 p.s.i.g. to vent air from cylinder 490 to atmosphere in a manner to be described more fully later on. The other operating port of valve 500 is blocked as indicated at 512.

Solenoids S5, S6, and S7 respectively control operation of valves 456, 476, and 500 which are all spring biased as shown. When solenoids S5, S6, and S7 are de-energized, valves 456, 476, and 500 are in their illustrated positions.

Before spindle ends 11 and 13 contact the axle housing center section and during the travel of the spindle ends from their retracted positions shown in FIG. 1 to positions where they contact the axle housing section, solenoids S1A, S1B, S5, S6, and S7 are all de-energized. With solenoid S1A de-energized, oil under pressure is, as previously described, delivered through valves 344 and 368 to the outboard ends of cylinders 54 and 55 for advancing carrier 22 forwardly. With solenoid S1B de-energized, oil likewise is delivered through valves 344a and 368a to the outboard ends of cylinders 32 and 33 to advance carrier 23 forwardly.

With solenoid S5 de-energized, valve 456 is spring biased to its illustrated position where conduit 454 is connected to conduit 462. Oil delivered by pump 450 will thus flow through conduits 454 and 462 to conduit 380 and from conduit 380 through valves 368a and 368 to conduit 372 for return to sump 244. Pump 450 thus will be running, but will merely be circulating the oil back to sump 244 when solenoids S1A, S1B, S5 are de-energized.

With valve 456 in its illustrated position and with solenoid S6 de-energized to allow valve 476 to be spring biased to its illustrated position, conduit 458 is connected to conduit 460, and conduit 460 is connected to conduit 478. Oil at the bottom of cylinder 464 drains through conduits 474, 460, 478, and 372 to sump 24 as piston 486 is urged downwardly by the pressure of oil delivered by pump 440 to the upper end of cylinder 464.

With solenoid S7 de-energized, valve 500 is spring biased to its illustrated position where it connects conduit 502 to atmosphere through check valve 510. The air pressure which is contained in cylinder 490 from a previous welding cycle is thus vented to atmosphere through conduit 498, manifold 496, conduit 502, valve 500, and check valve 506. Check valve 506 will maintain a minimum pressure of 3 p.s.i.g. in cylinder 490. At this stage flow of pressurized air from valve 508 will be blocked at 512.

When spindle ends 11 and 13 are brought into contact with the axle housing center section, they will be rotating by the drive connection provided to motors 46 and 67. The spindle ends 11 and 13 will continue to rotate after they contact the axle housing section for a timed period to frictionally generate heat that causes the abutting workpiece ends to become plastic or fusible. It is to be noted that the metal regions which are heated in this fashion and which ultimately define the weld, instead of melting, merely become plasticized.

Immediately after the spinning spindle ends 11 and 13 contact the axle housing center section, solenoids S1A, S1B, S5, S6, and S7 are all energized at the same time. By energizing solenoid S1A, valve 368 is shifted to connect conduits 362 and 380 respectively to conduits 372 and 370. Likewise, energization of solenoid S1B shifts valve 368 to its position where it connects conduits 380 and 362a respectively to conduits 370a and 372. This places the outboard ends of cylinders 32, 33, 54, and 55 in fluid communication with conduit 380. Valves 368 and 368a, in this position, also direct the oil being delivered by pumps 336 and 440 (which are running continuously) to sump 244 through the connection provided by conduit 372.

By energizing solenoid S5, valve 456 is shifted to connect conduits 462 and 458 respectively to conduits 454 and 460. As a result, conduits 380 and, consequently, the outboard ends of cylinders 32, 33, 54, and 55 will be connected through conduits 462, 474, and 458 to the lower end of cylinder 464. By energizing solenoid S6 with solenoid S5, valve 476 is shifted to its position where it blocks oil drainage through conduits 460 and 478 to the sump. The oil pressure in the outboard ends of cylinders 32, 33, 54, and 55 will now be equal to the pressure of oil supplied to the bottom of cylinder 464.

The oil delivered to cylinder 464 for raising piston 486 is supplied through restrictor 462 which is connected in the operative circuit when solenoid S5 is energized to shift valve 456 to its position where conduit 454 is connected to conduit 458. As a consequence, oil delivered by pump 450 is directed through conduits 454 and 458 and thus through restrictor 462, which reduces the rate of flow to the bottom of cylinder 464. The final buildup of pressure, at this stage, will be limited by relief valve 468, for this valve is now in the operative circuit along with restrictor 462. Valve 468 is set to maintain the final oil pressure in the heat cycle at a moderate value which is about one-half of the setting at which relief valve 480 bypasses oil to maintain the final weld pressure.

The oil delivered by pump 450 through restrictor 462 urges piston 486 upwardly against the back pressure from pump 440 which, at this stage, has been reduced to a low pilot pressure value as a result of being connected through valve 368a to conduit 372 in the previously described manner. Upward displacement of piston 486 displaces piston 488 upwardly through the common connection provided by piston rod 487.

Solenoid S7 having been energized at the same time as solenoids S1A, S1B, S5, and S6, shifts valve 500 to its position where pressurized air furnished through valve 508 is blown through conduit 502, manifold 496, and conduit 498 to the upper end of cylinder 490. As a result, upward displacement of piston 488 and, consequently, of piston 486 is opposed by the pressure of air introduced into cylinder 490. The pressurized air rapidly enters cylinder 490 and acts over a much greater piston area to apply a force for abruptly increasing the oil pressure delivered to cylinder 464 through conduit 458. This is an important feature of the invention as will be explained shortly.

The diameter of cylinder 490, as shown in FIG. 8, is preferably much greater than the diameter of cylinder 464. In practice, the diameters of cylinders 490 and 464 may be on the order of 10 inches and 3¼ inches respectively. As a result of this appreciable difference, the air pressure applied in cylinder 490 will cause a greater pressure to be developed in cylinder 464 in accordance with the ratios of the piston areas.

The build-up of air pressure in cylinder 490 will be approximately adiabatic to cause a corresponding exponential pressure build-up in the outboard ends of cylinders 32, 33, 54, and 55 as indicated by the curve section 530 in FIG. 10. It was discovered that if there is comparatively gentle pressure build-up in the outboard ends of cylinders 32, 33, 54, and 55 to forcibly urge the end workpieces against the center workpiece after the spinning end workpieces initially contact the center workpiece, the end workpieces would tend to batter back and forth against the center workpiece and cause burning of metal particles which become enveloped in the final weld. As these burned particles constitute oxides, their presence in the weld materially reduces the weld joint strength.

This objectionable condition would occur as where no significant air pressure is introduced into cylinder 490, allowing the upward movement of piston 488 only to be opposed by compression of air trapped in the cylinder. Such an air pressure build-up is adiabatic and would start from a relatively low value with the result that the increase in workpiece engagement pressure would be very gradually at the beginning as indicated by the dashed extension 532 of curve 530 in FIG. 10. This gradual build-up extends over a large period of time, and until a fairly large pressure build-up is attained for urging each end workpiece against the center workpiece, oxides, that eventually become enveloped in the weld, can develop. It is believed that the development of these oxides results from stick welds which occur when the initial workpiece engagement pressure is too low and not abrupt enough and which tend to force workpieces 11 and 13 away from the center workpiece with resultant battering.

The present invention avoids this gradual build-up and its consequent disadvantages by rapidly blowing air into cylinder 490 at relatively high pressure and as soon as the end workpieces contact the center workpiece. As a consequence, the initial build-up of oil pressure in cylinder 464 and thus in the outboard ends of cylinders 32, 33, 54, and 55 is abrupt and rapid as indicated by the curve section 534 in FIG. 10. This sudden build-up to a moderate pressure avoids stick welds and battering and was found to substantially eliminate the presence of oxides that would otherwise occur. From this abrupt pressure build-up the curve follows section 530 which is essentially exponential and gradual, but which has a greater slope than curve section 532. In essence, the portion of the pressure build-up (curve section 532) where the adiabatic curve is relatively flat is eliminated.

It was found that an abrupt and rapid build-up of pressure in the outboard travel cylinder ends of such magnitude as to exert a force on each end spindle (11, 13) of about 1500 pounds per square inch of workpiece area being welded in not more than three seconds and preferably within two seconds substantially eliminates the presence of oxides that would otherwise occur. As a result of this abrupt and material increase in axial thrust, the oxides in the weld are reduced to such a small amount as to be negligible and have no significant affect on the weld strength.

Abrupt build-up of workpiece engagement thrust to a very high value about 3000 pounds is objectionable since it would tend to stall the motor rotating the end workpiece as well as causing slippage and consequent marring of the end workpiece in chuck elements 121. Therefore, the pressure build-up following the abrupt build-up to an intermediate value of from 1500 pounds to 3000 pounds per square inch of workpiece area being welded is preferably made gradual as indicated by exponential curve section 530.

When piston 486 reaches the upper limit of its stroke (i.e., bottoms out at the upper end of cylinder 464), the force curve shown in FIG. 10 becomes essentially flat as indicated by section 596. The transition from curve section 530 to curve section 596 could be a step function depending upon the relief afforded by valve 468. At this stage, the end workpieces 11 and 13 are still being rotated, and the pressure in the outboard ends of cylinders 32, 33, 54, and 55 is adjusted to be about one-half of the final workpiece-engaging weld pressure. This value, however, is not an essential requirement.

When piston 486 bottoms out at the upper limit of its stroke, there will be a small clearance between the arrested position of piston 488 and the upper limit of its stroke. In this embodiment the clearance is about 1¼ inches. The effective clearance volume can be adjusted by opening the valves for one or more of the tanks 504.

As will be explained in greater detail later, rotation of the spinning workpieces 11 and 13 is arrested, according to this embodiment, after piston 486 bottoms out. However, rotation of workpieces 11 and 13 may be arrested either before or after the final weld pressure (which is indicated by the curve section 540 in FIG. 10) is reached.

As shown in FIG. 10, a final, increased workpiece-engagement pressure is applied to drive workpieces 11 and 13 against the center workpiece with still greater force after the rotation of workpieces 11 and 13 is stopped. However, this increased pressure may be applied during rotation of workpieces 11 and 13, as long as it is held for a predetermined time after the rotation of the workpieces is arrested.

The increased weld pressure mentioned above is produced by de-energizing solenoids S5 and S6. De-energization of solenoid S5 re-connects conduits 454 and 460 to conduits 462 and 458 respectively. As a result, the outboard ends of cylinders 32, 33, 54, and 55 are placed in direct communication with pumps 450 through conduits 454, 462, and 380 (solenoids S1A and S1B being still energized at this stage). In addition, restrictor 462 and relief valve 468 are effectively removed from the active circuit, as conduits 458 and 466 are now connected through valve 456, through conduit 460, through valve 476 (which is now in its illustrated drain position as a result of de-energizing solenoid S6), and through conduit 372 to sump 244. The maximum pressure maintained in conduit 454 and, consequently, in the outboard ends of cylinders 32, 33, 54, and 55 is now under the control of relief valve 480 which is set to provide the maximum or final weld pressure.

As shown in FIG. 10, the final pressure (curve section 540) applied to urge workpieces 11 and 13 against the center workpiece is increased considerably to produce a force of no less than 15,000 pounds per square inch of workpiece area being welded for SAE 1035 steel. This final weld force will be governed by the material being welded. This relatively high pressure is maintained until the weld, which was formed at the moment rotation of the end workpieces 11 and 13 was arrested, has cooled sufficiently to generate a strong weld. The weld is now completed. The unitary welded article is then released from chuck elements 121 and carriers 22 and 23 are returned to their retracted positions. This is accomplished by energizing solenoid S10 for valve 224. After that, solenoid S11 is energized and solenoid S11A is de-energized to shift valve 252 to its position where it connects conduits 256 and 258 respectively to conduits 254 and 248 for releasing the jaws of both fixtures 17. In addition, solenoid S12A is de-energized and solenoid S12 is energized to shift valve 286 to its position for unclamping jaws 15 and 16 in the manner previously described. The welded workpiece structure is now released for removal.

The foregoing completes the description of the hydraulic circuit for the welding machine of this invention. The electrical control and sequencing circuit for operating the various solenoids in the hydraulic circuit as well as the other previously described electrical components will now be described.

Referring now to FIG. 9A, the control and sequencing circuit is shown in a de-energized condition and comprises a transformer 550 having a primary winding 552 connected across two conductors of a three-phase line 554 which provides a source of voltage for the equipment.

The secondary winding 556 of transformer 550 is connected across a pair of conductors 560 and 561. To energize transformer 550 a main switch 564 in the three phase line is closed.

If oil in sump 244 is below an optimum operating temperature, a heater control relay H1 will be energized. This energizing circuit may be traced from conductor 560 through a thermostatically controlled switch 566, and through the operating coil of relay H1 to conductor 561. When relay H1 is energized, contacts H1–1, H1–2, and H1–3 (FIG. 9D) are closed to connect a heater 568 to the three phase line 554.

Heater 568, as shown in FIG. 6, is located in sump 244 to pre-heat the oil which will be delivered to the previously described hydraulic circuit and thus to the hydrostatic journal and thrust bearings in carriers 22 and 23 when operation of the machine is started. A lamp 570 (FIG. 9A) in parallel with relay H1 is illuminated when relay H1 is energized to indicate that the heater is on.

A thermostat 572 (see FIGS. 6 and 9A) in sump 244 opens switch 566 when the sump oil is pre-heated to its operating temperature. Relay H1 will therefore de-energize to de-energized heater 568 by opening contacts H1–1, H1–2, and H1–3. When switch 566 opens, lamp 570 is extinguished, indicating that the sump oil is up to temperature. The machine is now in condition to be started, and during its operation heater 568 normally will remain de-energized owing to the heat generated by the hydrostatic bearings.

To start operation, a spring-loaded push-button master start switch 580 (FIG. 9A) is momentarily depressed to energize a master control relay CRM through all sets of normally closed overload contacts (of which only two are shown for illustrative purposes as indicated 582 and 584) and through a normally closed spring-loaded, push-button master stop switch 586. Energization of relay CRM closes a set of normally open contacts CRM–1 to provide a holding circuit for maintaining relay CRM energized after switch 580 is released.

The overloaded contacts (582, 584) are associated with the various motor and motor starter circuits and open when an overload occurs in the equipment to interrupt the energizing circuit for relay CRM. This will de-energize the circuitry now to be described.

As shown in FIG. 9A, energization of relay CRM closes two sets of normally open contacts CRM–2 and-CRM–3 which are respectively contained in conductors 560 and 561. By closing contacts CRM–2 and CRM–3 the secondary transformer voltage is placed across the remaining portions of conductors 560 and 561 shown in FIGS. 9A, 9B, and 9C. As a result, solenoid S10 (FIG. 9A) will be energized through a set of normally closed contacts CR4–1, solenoid S11 (FIG. 9A) will be energized through a set of normally closed contacts CR3–1, and solenoid S12 (FIG. 9A) will be energized through a set of normally closed contacts CR2–1. Solenoid S10 controls operation of valve 224 for the hydrostatic journal bearing hydraulic circuit shown in FIG. 6. No oil, as yet, is flowing through any of the hydraulic circuits in FIGS. 6–8 since the pump motors 202, 246, and 338 have not been energized at this stage.

In addition to the foregoing, relay CR12 (FIG. 9C) will be energized through a limit switch LS3. Switch LS3, as shown in FIG. 8, is actuated by movement of piston rod 487 and will be closed when piston 488 reaches the lower end of its stroke. Piston 488 will normally be in this position following each weld cycle.

Energization of relay CR12 closes two sets of normally open contacts CR12–1 (FIG. 9C) and CR12–2 FIG. 9B). Contacts CR12–1 complete a holding circuit through a set of normally closed contacts CR10–5 to maintain relay CR12 energized when switch LS3 opens. Switch LS3 will open when oil is delivered to cylinder 464 to displace piston 486 and rod 487 upwardly as viewed from Fig. 8.

Contacts CR12-2 are contained in an energizing circuit for a deceleration timer TD2 (FIG. 9B) for a purpose which will be described later on.

After switch 580 is depressed to energize the relays and solenoids mentioned above, spring-loaded push-button motor start switches 590, 591, and 592 (see FIG. 9A) are momentarily depressed. Depression of switch 590 completes a circuit through a normally closed spring-loaded push-button stop switch 594 to energize a motor starter relay M4 for the oil bearing motor 2002 (FIGS. 9D and 6). Energization of relay M4 closes four sets of normally open contacts M4-1, M4-2, M4-3, and M4-4. By closing contacts M4-4 (see FIG. 9A) a holding circuit for maintaining relay M4 energized after switch 590 is released is completed through switch 594.

By closing contacts M4-1, M4-2, and M4-3, which are shown in FIG. 9D, an energizing circuit is completed for motor 202. Motor 202 is de-energized by depressing switch 594 which interrupts the energizing circuit for relay M4 to open contacts M4-1, M4-2, and M4-3.

Depressing switch 591 completes an energizing circuit for a motor starter relay M3 through a normally closed, spring-loaded, push-button stop switch 595. Energization of relay M3 closes four sets of normally open contacts M3-1, M3-2, M3-3, and M3-4, of which contacts M3-4 are shown in FIG. 9A. By closing contacts M3-4, a holding circuit is completed through switch 595 to maintain relay M3 energized after switch 591 is released.

Contacts M3-1, M3-2, and M3-3, which are shown in FIG. 9D, complete an energizing circuit for motor 246 when they are closed by energization of relay M3. To de-energize motor 246, switch 594 is depressed to interrupt the energizing circuit for relay M3 and thereby open contacts M3-1, M3-2, M3-3, and M3-4.

By depressing switch 592, an energizing circuit for a motor starter relay M5 is completed through a normally closed, spring-loaded, push-button stop switch 596. Energization of relay M5 closes four sets of normally open contacts M5-1, M5-2, M5-3, and M5-4, of which contacts M5-4 are shown in FIG. 9A. By closing contacts M5-4, a holding circuit is completed for maintaining relay M5 energized through switch 596 when switch 592 is released.

Contacts M5-1, M5-2, and M5-3, which are shown in FIG. 9D, energize motor 338 when closed by energization of relay M5. To de-energize motor 338, switch 596 is depressed to interrupt the energizing circuit for relay M5 and thus open contacts M5-1, M5-2, M5-3, and M5-4.

Energization of motors 202, 246 and 338 starts pumps 203 (FIG. 6), 204 (FIG. 6), 212 (FIG. 6), 240 (FIG. 7), 440 (FIG. 8), 450 (FIG. 8), and 336 (FIG. 8).

At this stage, clamping relays CR2 (FIG. 9A) and CR3 (FIG. 9A) will be de-energized. When relay CR2 is de-energized contacts CR2-1 are closed to complete an energizing circuit for solenoid S12 as previously explained. A normally open set of contacts CR2-2 (FIG. 9A) of relay CR2 will be open to prevent energization of solenoid S12A.

With solenoid S12 energized and solenoid S12A de-energized valve 286, as previously explained, will be shifted to its unclamping position. When pump 240 is started, therefore, oil will be delivered to cylinder 294 to move jaws 15 and 16 to their unclamped positions.

With relay CR3 de-energized, contacts CR3-1 will be closed to provide the previously described energizing circuit for solenoid S11. Solenoid S11A, however, will be de-energized since it is in series with a set of normally open contacts CR3-2 of relay CR3.

With solenoid S11A de-energized and with solenoid S11 energized, valve 252 will be shifted to its position where it delivers oil from pump 240 to motors 264 and 266 for unclamping the jaws of fixtures 17. The center workpiece 12 may now be loaded in the machine.

With pumps 203, 204, and 212 running, oil will be delivered to the hydrostatic journal and thrust bearings in carriers 22 and 23. The pressure of the oil delivered by pump 212 to the journal bearings, however, will be limited by valve 222 to a relatively low value since solenoid S10 is presently energized as previously explained. The oil pressure in chamber 106 (FIG. 3) will therefore be relatively low and piston 107 will be biased by spring 112 to its forward position where the chuck elements 121 in carriers 22 and 23 are pushed forwardly for receiving, but not yet clamping the end workpieces 11 and 13.

At this stage it is necessary to momentarily depress an emergency reset, spring-loaded, push-button switch 600 (FIG. 9A) to momentarily energize a reset relay CR1 through a set of normally closed contacts CR5-5. This will ensure that the control circuitry is reset and ready for operation. When relay CR1 is pulsed in this manner, normally open contacts CR1-1 (FIG. 9C), CR1-2 (FIG. 9B), CR1-3 (FIG. 9B), and CR1-4 (FIG. 9D) are momentarily closed.

By momentarily closing contacts CR1-1, relay CR10 (FIG. 9C) is pulsed. Pulsing relay CR10 momentarily opens normally closed contacts CR10-1 (FIG. 9A), CR10-2 (FIG. 9B), CR10-3 (FIG. 9B), CR10-4 (FIG. 9B), and CR10-5 (FIG. 9C). Momentarily opening contacts CR10-1 ensures that start cycle relay CR4 (FIG. 9A) is de-energized with all of its contacts reset. Momentarily opening contacts CR10-2 clears timer TD1 (FIG. 9B). Momentarily opening contacts CR10-3 opens the circuit to the left-hand deceleration relay CR7 (FIG. 9B) to assure that its contacts are reset. Momentarily opening contacts CR10-4 opens the circuit to the right-hand deceleration relay CR8 to ensure that its contacts are reset. Momentarily opening contacts CR10-5 will have no effect provided switch LS3 is closed.

Momentary closure of contacts CR1-2 and CR1-3 provides a safety interlock to deactivate the deceleration override circuits which will be described in greater detail later on.

By momentarily closing contacts CR1-4 (FIG. 9C), relay CR13 is energized and is latched in by a holding circuit which is completed through stop switches 604 and 605 by the closing of the normally open contacts CR13-4 (FIG. 9C). Energization of relay CR13 closes normally open contacts CR13-1 (FIG. 9A), CR13-2 (FIG. 9B), CR13-3 (FIG. 9C), and CR13-6 (FIG. 9C). Also, energization of relay CR13 opens a normally closed set of contacts CR13-5 (FIG. 9C). The circuits that will eventually be completed through contacts CR13-1, CR 13-2, CR13-3, and CR13-6 will be described shortly. Opening of contacts CR13-5 simply extinguishes an indicator lamp 608.

Following the momentary depression of switch 600, spring-loaded, push-button motor start switches 610 and 611, which are shown in FIG. 9A, are momentarily depressed. Depression of switch 610 completes a circuit through a normally closed spring-loaded, push-button stop switch 612 to energize a motor start relay M1 for motor 67. Energization of relay M1 closes four sets of normally open contacts M1-1, M1-2, M1-3, and M1-4. Closing of contacts M1-4, as shown in FIG. 9A, completes a holding circuit through switch 612 for maintaining relay M1 energized when switch 610 is released.

Contacts M1-2, M1-3, and M1-1, which are shown in FIG. 9D, energize motor 67 when they are closed by energization of relay M1. To de-energize motor 67, switch 612 is depressed to interrupt the holding circuit for relay M1 and thus open contacts M1-1, M1-2, and M1-3.

By depressing switch 611, a circuit is completed through a normally closed, spring-loaded, push-button stop switch 613 to energize a motor starter relay M2 for motor 46. Energization of relay M2 closes normally open contacts M2-1, M2-2, M2-3, and M2-4. Closing of contacts M2-4 (FIG. 9A) completes a holding circuit for maintaining relay M2 energized when switch 611 is released. Contacts M2-1, M2-2, and M2-3, as shown in FIG. 9C, are closed to energize motor 46. Motor 46 is deenergized by depressing switch 613 to interrupt the holding circuit for relay M2, thus opening contacts M2–1, M2–3, and M2–4. Rotation is not imparted to shafts 58 and 38 as yet since the motor clutches 47 and 68 have not been energized at this stage.

The foregoing is the condition of the control circuit before each welding cycle is initiated. Motors 46, 67, 202, 246 and 338 will run continuously during and between welding cycles.

The workpieces 11, 12 and 13 are now loaded into the machine in the manner previously described, and a spring-loaded, push-button switch 616 (FIG. 9A) is depressed to complete a circuit through two normally closed spring-loaded, push-button switches 618 and 619 for energizing the end clamp relay CR3. Energization of relay CR3 closes normally open contacts CR3–2 and CR3–3, both shown in FIG. 9A. By closing contacts CR3–3 a holding circuit is completed through switches 618 and 619 to maintain relay CR3 energized when switch 616 is released. By closing contacts CR3–2, solenoid S11A is energized.

Energization of relay CR3 also opens normally closed contacts CR3–1 to interrupt the energizing circuit for solenoid S11. With solenoid S11A energized and solenoid S11 de-energized, valve 252 as previously described is shifted to a position where oil is delivered to motors 264 and 266 for moving the jaws of fixtures 17 to engage and clamp the ends of the axle housing center section.

With the ends of the axle housing center section clamped in place by fixtures 17, a spring-loaded, push-button switch 620 (FIG. 9A) is then depressed to complete a circuit through normally open contacts CR3–4 which are now closed as a result of energizing relay CR3. Contacts CR3–4 provide an interlock to prevent the center of the axle housing section from being clamped before the ends of the axle housing section are clamped in place by fixtures 17. This conforms to the preferred clamping sequence explained in connection with the hydraulic circuit shown in FIG. 7.

By energizing relay CR2, normally open contacts CR2–3 close to complete a holding circuit for maintaining relay CR2 energized through switches 618 and 619 when switch 620 is released. Normally open contacts CR2–2 also close to energize solenoid S12A, and normally closed contacts CR2–1 open to de-energize solenoid S12.

With solenoid S12A energized and solenoid S12 de-energized, valve 286 is shifted to its position where the oil delivered to cylinder 294 is operative to move jaws 15 and 16 into clamping engagement with the center of the axle housing section in the manner previously described.

At the same time that relay CR2 is energized, solenoid S13 (FIG. 9A), which is in parallel circuit relationship with relay CR2, is also energized and is latched through the holding circuit provided for relay CR2. By energizing solenoid S13, the limit of the pressure build-up for clamping jaws 15 and 16 against the axle housing center section is appreciably increased in the manner previously explained in connection with the hydraulic circuit shown in FIG. 7.

At this stage, the axle housing center section (13) is clamped firmly in place. When the increased oil pressure resulting from the energization of solenoid S13 enters cylinder 294 to shift 296 in a jaw-clamping direction, a pressure switch PS2 (FIGS. 9A and 7) is closed.

With switch PS2 closed, the start cycle relay CR4 may now be energized by depressing a spring-loaded, push-button switch 624 (FIG. 9A). This completes a circuit through contacts CR13–1 (which are closed as a result of having energized and latched in relay CR13), through switch PS2, and through a pair of normally closed switches LS4 and LS5 to energize relay CR4. Switches LS4 and LS5 will be closed if the hydrostatic oil bearing filters 20 and 208 are not clogged. If one or both of the filters is clogged one or both of the switches LS4 and LS5 will open to prevent the completion of an energizing circuit for relay CR4.

By energizing relay CR4, normally open contacts CR4–2 (FIG. 9A) are closed to complete a holding circuit through contacts CR10–2 to maintain relay CR4 energized when switch 624 is released. Energizing relay CR4 also closes a set of normally open contacts CR4–3 (FIG. 9A) to provide a circuit through contacts CR3–3 for latching relay CR3 and also to provide a circuit through contacts CR2–3 for latching relay CR2. Relays CR2 and CR3 will remain energized at this stage to keep the center workpiece clamped in place even though any one of the switches 618 and 619 is depressed to a circuit interrupting position.

When relay CR4 energizes it also opens the normally closed contacts CR4–1 to de-energize solenoid S10. As a result, valve 224 (FIG. 6) is shifted to its position where relief valve 222 will allow the oil pressure to build up to an appreciably higher pressure as previously described. With this pressure build-up, the pistons 107 in carriers 22 and 23 will shift to their outboard positions where chuck elements 121 close to grip the two end workpieces 11 and 13. Also with pressure build-up, pressure switch PS1 (FIGS. 6 and 9B) will close to energize an operating solenoid 626 of timer TD1.

As will become apparent shortly, timer TD1 starts the beginning of the welding cycle and times the period that the end workpieces 11 and 13 are rotated. Energization of solenoid 626 closes the normally open timer contacts TD1–A to start the timing motor 628. The circuit for energizing solenoid 626 will be through contacts CR10–2 which are closed at this stage.

With switch PS1 closed and with contacts CR10–2 closed, a circuit is completed for energizing a brake release relay CR14 (FIG. 9B). Energization of relay CR14 closes a set of normally open contacts CR14–1 (FIG. 9C) to energize a pair of brake release solenoids 9A and 9B. Energization of solenoids 9A and 9B respectively release brake units 48 and 69.

When switch PS1 closes a circuit will be completed through the pressure switch, through contacts CR10–2, and through a conductor 630 to energize an operating solenoid 632 (FIG. 9B) of a timer TD5. Energization of timer TD5 closes a set of normally open contacts TD5–A to energize the timing motor 624. The purpose of this timer will be described shortly.

As shown in FIG. 9B, contacts TD1–A simply are normally open contacts, but contacts TD1–B and TD1–C of timer TD1 are controlled by motor 628. Contacts TD1–B will be open before motor 628 is energized, will remain open while motor 628 is energized and timing, and will close when motor 628 times out. This sequence of contact actuation is schematically illustrated by the three boxes above the contacts wherein "O" indicates an open contact condition and "X" represents a closed contact condition. The left, center, and right boxes respectively indicate the condition of contacts before the timing motor is energized, when the timing motor is energized, and timing, and finally when the timing motor has timed out. This schematic designation has also been applied for the other motor-controlled timer contacts in FIGS. 9A, 9B and 9C.

As soon as motor 628 is energized and begins timing, therefore, contacts TD1–C close, and a circuit is completed through contacts CR13–2 for energizing a pair of clutch solenoids S8A and S8B. Energization of solenoid S8A engages clutch unit 47. With the brakes units released, motors 67 and 46 will respectively be drive connected to start rotation of shafts 58 and 38 and, consequently, the end workpieces 11 and 13 clamped in chuck elements 121. The welding cycle has now begun and workpieces 11 and 13 are spinning.

Timers TD1 and TD5, as is clear from the foregoing and as indicated on FIG. 10, begin timing at the same time. Timer TD5 performs a delay function in that it allows the rotational speed of workpieces 11 and 13 to come up to a desired rate before the end workpieces engage the center workpiece. Thus, where the travel time involved in advancing workpieces 11 and 13 into engagement with the center workpiece is not long enough to allow the spinning workpieces to come up to speed, timer TD5 is employed to momentarily delay the forward advancement of the workpieces and thus provide an additional time period in which the rotational workpiece speed may increase. Timer TD1 functions to keep the end workpieces rotating after they contact the center workpiece and until sufficient heat is frictionally generated for welding.

In this embodiment, timer TD1 is set to time out in about 28 seconds, whereas timer TD5 will be set to time out in approximately one second where the distance between adjacent workpieces is about 8 to 10 inches.

As shown in FIG. 9A, timer TD5 has a set of motor controlled contacts TD5-B which are open before motor 634 is energized, which remain open when motor 634 is energized and timing, and which close when motor 634 times out. Thus when motor 634 times out, contacts TD5-B close to complete an energizing circuit for a relay CR5 (FIG. 9A).

Energization of relay CR5 closes a set of normally open contacts CR5-1 (FIG. 9A) to energize solenoid S2A, closes a set of normally open contacts CR5-2 (FIG. 9A) to energize solenoid S2B, closes a set of normally open contacts CR5-3 (FIG. 9B) to energize solenoids S3A and S4A through a set of normally closed contacts CR7-3, closes a set of normally open contacts CR5-4 to energize solenoids S3B and S4B through a set of normally closed contacts CR8-3, and opens normally closed contacts CR5-5 (FIG. 9A) to prevent energization of relay CR1 by depression of switch 600.

With solenoids S2A, S3A, and S4A energized, carrier 22 is accelerated forwardly at a relatively rapid rate owing to the high oil flow rate resulting from energization of solenoids S3A and S4A as previously described. Likewise, carrier 23 will also be accelerated forwardly at relatively rapid rate with solenoids S2B, S3B, and S4B energized in the manner described in connection with the hydraulic circuit shown in FIG. 8.

As the spinning workpieces 11 and 13 approach the center workpiece a pair of limit switches LS2A and LS2B as shown in FIGS. 8 and 9B are tripped to their closed positions to respectively energize deceleration relays CR7 and CR8. Energization of relays CR7 and CR8, as will now be described, initiates the deceleration period for workpieces 11 and 13 respectively.

Energization of relay CR7 closes a set of normally open contacts CR7-1 to complete a holding circuit for maintaining relay CR7 energized after switch LS2A opens. Energization of relay CR7 also closes normally open contacts CR7-2 (FIG. 9B) and opens normally closed contacts CR7-3. Contacts CR7-2 are contained in an energizing circuit for timer TD2 and will be described shortly. Opening of contacts CR7-3 (FIG. 9B) deenergizes solenoids S3A and S4A.

Energization of relay CR8 closes normally open contacts CR8-1 (FIG. 9B), closes normally open contacts CR8-2 (FIG. 9B), and opens normally closed contacts CR8-3. By closing contacts CR8-1, a holding circuit is completed through contacts CR10-4 for maintaining relay CR8 energized when switch LS2B opens. Opening of contacts CR8-3 de-energizes solenoids S3B and S4B.

By de-energizing solenoids S3A, S4A, S3B, and S4B, valves 348, 388, 348a, and 388a are shifted in the manner previously described to reduce the oil flow rate applied in cylinders 32, 33, 54, and 55 for accelerating carriers 22 and 23 forwardly and to place restrictors 390 and 390a in the active part of the hydraulic circuit to increase the back pressure at the inboard ends of cylinders 32, 33, 54, and 55. As a result, the end workpieces 11 and 13 will rapidly decelerate to gently contact the center workpiece without rebounding in the manner previously explained.

By closing contacts CR7-2 and CR8-2 a circuit, as shown in FIG. 9B, is completed through limit switches LS1A and LS1B and contacts CR12-2 (which are closed at this stage) to energize an operating solenoid 640 for timer TD2. Limit switches LS1A and LS1B, as shown in FIG. 8, will close when carriers 22 and 23 begin to move toward each other. Timer TD2 controls the deceleration time period.

When solenoid 640 is energized, it closes a set of normally open contacts TD2-A to start the timer motor 642. A set of motor controlled timer contacts TD2-B, as shown in FIG. 9B, are open before motor 642 is started, remain open when motor 642 is energized and timing, and close when motor 642 times out. In this embodiment, motor 642 times out in about 1 second, at which time contacts TD2-B close to complete a circuit for energizing relay CR9. The end workpieces 11 and 13, which are now decelerating, will contact the center workpiece just about the time that timer TD2 times out.

Energization of relay CR9 closes its four sets of normally open contacts CR9-1 (FIG. 9B), CR9-2 (FIG. 9B), CR9-3 (FIG. 9C), and CR9-4 (FIG. 9C). By closing contacts CR9-1 new circuits are completed for maintaining solenoids S3A and S4A energized. Likewise, closure of contacts CR9-2 maintains solenoids S3B and S4B energized. Closing of contacts CR9-3 completes a circuit for energizing an operating solenoid 646 of timer TD3 for timing the workpiece-contact welding period. Closing of contacts CR9-4 completes a circuit for energizing an operating solenoid 648 in another timer TD4 which times the heat build-up period.

Energization of solenoid 646 closes a set of normally open contacts TD3-A (FIG. 9C) to start the timer motor 650. Similarly, energization of solenoid 648 closes a set of normally open contacts TD4-A (FIG. 9C) to start the timer motor 652. At this stage, timers TD1, TR3, and TD4 will be timing.

Timer TD3-A, as shown in FIG. 9C, is provided with two sets of motor-controlled timer contacts TD3-B and TD3-C. Contacts TD3-B are open before motor 650 is started, close immediately when motor 650 is started, remain closed while motor 650 is running and thus timing, and open when motor 650 times out. Contacts TD3-C are open before motor 650 starts, remain open when motor 650 is energized and timing, and close when motor 650 times out.

Thus as soon as relay CR9 energizes, motor 650 is started and contacts TD3-B close to energize solenoids S1A, S1B, and S7. The energization of these solenoids, will be recalled, increases the oil flow rate to abruptly build up the oil pressure in the outboard ends of cylinders 32, 33, 54, and 55 for pushing the still spinning end workpieces 11 and 13 against the center workpiece with increased force. The operation of solenoids S1A, S1B, and S7 in the hydraulic circuit to produce this initial pressure build-up has already been described.

As timer TD4 continues to time along with timers TD1 and TD3, the pressure build-up from the initial abrupt build-up becomes more gradual as previously explained and as shown by curve section 540 in FIG. 10. Timer TD4 allows the oil pressure to build up sufficiently to force the spinning end workpieces 11 and 13 against the center workpiece with the previously mentioned terminal heat cycle pressure. Workpieces 11 and 13 in this embodiment will be rotating at about 2500 r.p.m. The welding period controlled by timer TD3 begins essentially when the end workpieces 11 and 13 contact the center workpiece and just as soon as timer TD2 times out and does not terminate until the final weld pressure (curve section 540) is released.

Preferably, before timer TD4 times out, timer TD1 will time out for arresting rotation of the spinning workpieces 11 and 13. At this time, sufficient heat has been frictionally generated by rubbing contact between the adjacent workpieces to plasticize the adjacent workpieces ends. In this state the weld joints at the abutting workpiece ends will form as soon as rotation of workpieces 11 and 13 is arrested.

When timer TD1 times out, contacts TD1–C open to de-energize solenoids S8A and S8B with the result that the motor clutch units are released to disengage motors 46 and 67. Contacts TD1–B will close when timer times out to energize relay CR6, as shown in FIG. 9B. Energization of relay CR6 opens a set of normally closed contacts CR6–1 (FIG. 9C) to interrupt the energizing circuit for the brake solenoids S9A and S9B. As a result, the brake units 48 and 69 are applied to arrest rotation of shafts 38 and 58 and, consequently, workpieces 11 and 13. A brake control switch 656 (FIG. 9C) is shunted around contacts CR6–1. By opening switch 656, workpieces 11 and 13 are allowed to coast to a stop without being braked.

It will be noted that contacts TD1–A and TD1–B remain closed until timer TD1 is reset. The brake units remain on until timer TD1 is reset.

In this embodiment, timer TD4 times out shortly after timer TD1 times out to operate the control circuit for applying the final weld pressure. By timing out, timer TD4 opens contacts TD4–B and closes contacts TD4–C. Contacts TD4–A and TD4–C will remain closed until the timer is reset.

By opening contacts TD4–B, solenoids S5 and S6 are de-energized with the result that oil pressure in the outboard ends of cylinders 32, 33, 54, and 55 will be allowed to build up to the higher relief limit provided by relief valve 480 as preveiously explained.

By closing timer contacts TD4–C, a relay CR11 (FIG. 9C) is energized. Energization of relay CR11 closes a set of normally open contacts CR11–1 (FIG. 9B) to provide an interlock for timer TD2, thus preventing timer TD2 from being reset until carriers 22 and 23 are returned to their retracted positions shown in FIG. 1 at the completion of the welding cycle.

After the welds are formed and cooled sufficiently, timer TD3 times out, signalling the completion of the welding cycle and operating the control circuit to return carriers to their retracted positions after chuck elements 121 have been unclamped.

When timer TD3 times out, contacts TD3–B open and contacts TD3–C close. Contacts TD3–C remain closed until the timer is reset. By opening contacts TD3–B, solenoids S1A, S1B, and S7 are all de-energized with the result that the high oil pressure in the outboard ends of cylinders 32, 33, 54 and 55 is removed and the cylinders are transferred back to their respective travel pumps. This operation was previously described in connection with FIG. 8.

By closing contacts TD3–C relay CR10 (FIG. 9C) is energized. Energization of relay CR10 opens its five sets of normally closed contacts CR10–1 (FIG. 9A) CR10–2 (FIG. 9B), CR10–3 (FIG. 9B), CR10–4 (FIG. 9B), and CR10–5 (FIG. 9C). By opening contacts CR10–1, relay CR4 is de-energized and all of its previously descirbed contacts are reset for the next welding cycle. At this stage, therefore, contacts CR4–1 are closed to energize solenoid S10 with the result that the oil pressure in piston chambers 106 in carriers 22 and 23 will reduce, allowing pistons 107 to move forwardly to the positions where chuck elements 121 unclamp from workpieces 11 and 13.

By opening contacts CR10–2, timers TD1 and TD5 are reset and relay CR6 is de-energized. Contacts CR6–1 for the brake unit solenoids S9A and S9B will thus be reset. Relay CR5 (FIG. 9A) will also be de-energized to de-energize solenoids S2A and S2B.

By opening contacts CR10–3 relay CR7 is de-energized with the result that its contacts will be reset. By opening contacts CR10–4, relay CR8 is de-energized to reset the previously described contacts of relay CR8. By opening of contacts CR10–5, relay CR12 is unlatched and its previously described contacts are reset.

At this stage, a circuit through switches LS1A and LS1B and through contacts CR11–1 is maintained to prevent timer TD2 from being reset. As a result contacts TB2–B remain closed after timer TD2 times out. Solenoids S3A, S3B, S4A, and S4B will be energized through contacts CR9–1 and CR9–2 when timer TD2 times out and will be maintained energized as a result of the holding circuit through switches LS1A and LS1B and contacts CR11–1 which prevents timer TD2 from being reset. Solenoids S3A, S3B, S4A, and S4B will thus be energized at the end of the weld cycle at which time solenoids S1A, S1B, S2A, S2B, and S7 are all de-energized as previously described. As a result, the hydraulic circuit at the end of the welding cycle is automatically conditioned to return carriers 22 and 23 to their retracted position in the manner previously described. As already explained, this will occur by delivering oil to the inboard ends of cylinders 32, 33, 54 and 55. As pistons 330–333 are moved toward the outboard ends of their respective cylinders, switches LS2A and LS2B will close again, but relays CR7 and CR8 will not re-energize since relay CR10 is still energized, keeping contacts CR10–3 and CR10–4 open.

When carriers 22 and 23 approach their retracted positions, switches LS1A and LS1B are opened, resetting timer TD2. Contacts TD2–B will therefore de-energize relay CR9. De-energization of relay CR9 opens contacts CR9–1 and CR9–2 to de-energize solenoids S3A, S4A, S3B, and S4B. Pistons 330–333 and, consequently, carriers 22 and 23 will be decelerated and thus come to a gentle stop at their retracted positions.

De-energization of relay CR9 also opens contacts CR9–3 and CR9–4 to reset timers TD3 and TD4. Contacts TD3–C and TD4–C will therefore open to de-energize relays CR10 and CR11 respectively. All of the previously described contacts for relays CR10 and CR11 will now be reset. Timers TD1 and TD5 will have been reset by opening switch PS1. This will have occurred when solenoid S10 was energized to reduce the journal bearing pressure and to unclamp the end workpieces 11 and 13 at the end of the welding cycle. As a result, all of the timers, TD1, TD2, TD3, TD4, and TD5 are now reset as well as the relays except for those in the active circuit for clamping the center workpiece through fixtures 17 and jaws 15 and 16.

The center workpiece with the end workpieces welded thereto are released for removal from the machine by depressing either of the unclamping switches 618 and 619 (FIG. 9A) to interrupt the energizing circuit for relay CR3. De-energization of relay CR3 closes contacts CR3–1 and opens contacts CR3–2 and CR3–3. By closing contacts CR3–1, solenoid S11 is energized. By opening contacts CR3–2, solenoid S11A is de-energized. Opening of contacts CR3–3 prevents the relay holding circuit from being re-established when the depressed one of switches 618 and 619 is released.

With solenoids S11 and S11A respectively energized and de-energized, fixtures 17 are unclamped in the manner previously described.

De-energization of relay CR3 also opens contacts CR3–4 to interrupt the energizing circuit for relay CR2 and solenoid S13. De-energization of solenoid S13 reduces the high clamping pressure as previously described. De-energization of relay CR2 closes contacts CR2–1 to energize solenoid S12 and opens contacts CR2–2 to de-energize solenoid S12A.

With solenoids S12 and S12A respectively energized and de-energized, jaws 15 and 16 are moved to their unclamped positions in the manner previously described. Contacts CR2–3 also open to prevent the holding circuit for relay CR2 from being re-established.

The welded workpiece structure is now completely released and may be removed from the machine. When solenoids S12 and S12A were respectively energized and de-energized switch PS2 is opened. The machine may now be reloaded with new workpieces to be welded and the previously described welding cycle may be repeated by depressing the cycle start switch 624 after the new workpieces are clamped in place and switch PS2 has been re-closed.

As shown in FIG. 9A, a pair of spring-loaded, push-button forward jog switches 670 and 671 are provided for. Switch 670 is connected in parallel with contacts CR5–1 and when depressed will energize solenoid S2A even though contacts CR5–1 are open. Similarly, switch 671 is in parallel with contacts CR5–2 and when depressed will energize solenoid S2B when contacts CR5–2 are open. Thus carriers 22 and 23 may selectively be jogged forwardly (i.e., toward each other) when relay CR5 is de-energized.

Lamps 680 are connected in the circuit for simply indicating the energized conditions of the various relays.

Solenoids S3A and S4A may selectively be energized to override a decelerating condition of carrier 22 by depressing switch 600 and a further spring-loaded, push-button switch 686 (FIG. 9B). Depression of switch 600 energizes relay CR1 unless relay CR5 is energized. Energization of relay CR1 closes contacts CR1–2 to allow a circuit to be completed for energizing solenoids S3A and S4A when switch 686 is depressed. Similarly deceleration of carrier 23 can be overridden by depressing a spring-loaded, push-button switch 687 (FIG. 9B) when relay CR1 is energized. Depression of switch 687 will then complete a circuit through contacts CR1–3 to energize relays S3B and S4B.

Summarizing the welding operation described above, the machine is conditioned for operation by closing switch 564 and then by momentarily depressing the master start switch 580 after the oil in sump 244 has been pre-heated to the desired operating temperature. All of the motors 202, 246, 338, 46, and 67 are then started by depressing their associated start switches.

With the motors running, the center workpiece 12 is then clamped in the machine. This will result in the closure of pressure switch PS2. The end workpieces are inserted into the opened jaws of chuck elements 121, and the welding cycle may now be started by depressing the cycle-start switch 624.

Providing that switch PS1 is closed, signifying that the end workpieces are clamped in the carriers and that the higher operating pressure has been applied to the hydrostatic journal bearings in the carrier, timers TD1 and TD5 are energized. Their timing cycles begin simultaneously. Clutch units 47 and 68 are energized by energization of timer TD1 to start rotation of the end workpieces 11 and 13. Timer TD5, as previously mentioned, delays forward advancement of carriers 22 and 23 to allow the rotating workpieces 11 and 13 to come up to operating speed in the desired timer.

When timer TD5 times out, oil, at its higher accelerating pressure is delivered to the outboard ends of cylinders 32, 33, 54, and 55 to accelerate carriers 22 and 23 toward each other. As the end workpieces 11 and 13 approach the center workpiece, switches LS2A and LS2B are tripped to condition the electrical and hydraulic circuits for decelerating the forward advancement of carriers 22 and 23 to gently bring workpieces 11 and 13 into contact with workpiece 12. Timer TD2, which is started when switches LS2A and LS2B are tripped, times the deceleration period. Timer TD2 will be set to time out substantially at the moment the spinning end workpieces 11 and 13 contact the center workpiece. When timer TD2 times out, timers TD3 and TD4 are energized and begin their timing cycles simultaneously.

As soon as timer TD4 is energized it operates the electrical and hydraulic circuits to abruptly and rapidly increase the oil flow rate into the outboard ends of cylinders 32, 33, 54, and 55 to abruptly push the spinning workpieces 11 and 13 against the center workpiece with the previously mentioned force and in the previously mentioned time. This abrupt increase in the axial thrust applied to urge workpieces 11 and 13 against the center workpiece therefore occurs substantially upon engagement of the end workpieces with the center workpiece. Following this abrupt increase, the workpiece engagement pressure is then gradually increased over a longer period of time owing to the essentially adiabatic compression of the air in cylinder 490.

As the axial pressure applied to the spinning workpieces 11 and 13 is built up in this manner, time TD4 is timing along with timer TD1 and TD3. Timer TD4 is set to allow sufficient heat to be generated by rubbing engagement of the workpiece surface to cause the workpiece ends to become fusible. Just before timer TD4 times out, timer TD1 times out to stop rotation of the end workpieces 11 and 13. Timer TD4 then times out to operate the electrical and hydraulic circuits to abruptly and materially increase the oil pressure in the outboard ends of cylinders 32, 33, 54, and 55 to the final weld pressure. This final weld pressure is held until timer TD3 times out. Timer TD3 is set to allow sufficient time for the welds, which are formed when rotation of the end workpieces stops, to cool to a desired temperature.

Timer TD3 then times out to signal the completion of the welding cycle and to operate the electrical and hydraulic circuits for unclamping the end workpieces, which are now welded to the center workpiece, and returning carriers 22 and 23 to their retracted positions shown in FIG. 1.

After the jaws 15 and 16 and fixtures 17 are unclamped and the welded workpiece assembly is removed from the machine, another set of workpieces to be welded together may be placed and clamped in the machine. The next welding cycle is then initiated by depressing switch 624.

From the foregoing it is clear that two independent timing systems are provided in the automatic production of friction welds. The first system is defined by timer TD1 which determines the spinning time and which is adjusted to allow for rotational acceleration of the rotating mass at each carrier and the approach travel of the workpieces 11 and 13. Timer TD5 cooperates with timer TD1 in this first system to allow for a desired interval rotational acceleration before travel of the end workpieces is allowed to begin. The second timing system is defined by timers TD2, TD3, and TD4 and controls the workpiece engagement time period.

From the foregoing description it is clear that the first timing system mentioned above times independently of the second timing system and can be adjusted to time out at any time independently of the second timing system. Each timing can therefore be accurately adjusted to achieve optimum results depending upon the characteristics of the workpieces to be welded together.

In FIG. 10, curve 700 represents the watts consumed by motor 67. As shown, the power for the period starting with energization of timer TD3 and terminating when timer TD1 times out is relatively constant and moderate even though there has been an abruptly applied load immediately when the end workpiece 11 butts against the center workpiece. The decrease in power after the initial and abrupt application of workpiece engagement pressure results from the nature of the abutting workpiece regions as they become plasticized during heating.

It will be appreciated that the timers described above are conventional and that their respective timing periods are adjustable to handle different applications. Adjustment of timer TD1 may allow the engagement pressure to be increased to the level of curve section 540 before rotation of the end workpieces stops.

The internal details of the previously described relief valves shown in FIGS. 6–8 are illustrated in FIG. 11. Each valve essentially comprises a main valve closure member 720 which remains in the closed position on its seat 721 under the bias exerted by a spring 722 as long as the pressures in chambers 723 and 724 remain equal. Chamber 723 communicates with a vent passage 724a and chamber 724 connects to the inlet port of the valve. Member 720 is formed with a piston 725 which has its opposite faces acted upon hydraulic fluid pressure in chambers 723 and 724 respectively. A small passage 727 through piston 725 provides fluid communication between chambers 723 and 724. Member 720 normally remains closed until the pressure in chamber 723 exceeds the equivalent force of a spring 726. As soon as this occurs, a piston or pilot valve closure member 728 is forced off its seats, and pressure in chamber 724 will be limited by the escape of fluid through passage 724a past member 728 and down through a centrally drilled passage 729 in member 720 to the discharge port.

When pressure in chamber 724 increases further until it is sufficient to overcome pressure in chamber 723 and the force of spring 722, it lifts member 720 off its seat. This will allow fluid in chamber 724 to escape through the discharge port. In actual operation, member 720 normally will open just sufficiently to allow excess fluid to escape and will remain in this opened or throttling position as long as resistance to fluid flow causing pressure build-up is present in the system.

In each of the previously described Vickers Co. valve units, the vent passage 724a is connected to the solenoid-operated valve so that operation of the solenoid-operated valve externally controls the pressure of the fluid in passage 724a and thus in chamber 723. In the valve unit consisting of valves 384, 386, and 388, for example, passage 396 is connected to passage 724a. When solenoid S4A is de-energized therefore, the pressure in passage 424a and chamber 423 will be maintained at a relatively low value by operation of relief valve 386. The resistance to lifting piston 725 will be relatively low to maintain the relatively low clamping pressure for fixtures 17.

When solenoid S4A is energized, flow through passage 396 from chamber 423 is blocked. Pressure in chamber 424 must therefore increase further to overcome pressure in chamber 423 and the force of spring 726 for lifting member 720 off its seat. As a result, the resistance to lifting piston 725 will be greater and member 720 will maintain the relatively higher clamping pressure for the center clamp jaws 15 and 16.

The following valve units operate in the same manner: the assembly of valves 384a, 386a, and 388a; the assembly of valves 310, 314, and 316; and the assembly of valves 222 and 224. In this last-mentioned valve assembly passage 224a is connected to passage 724a so that chamber 724 directly communicates with sump 244 when solenoid S10 is energized. As a result, no pressure will exist in chamber 724 to resist movement of member 720 to its opened position to thus maintain the pressure in conduit 214 at a relatively low pressure which is slightly above zero p.s.i.g. However, when solenoid S10 is de-energized, flow of oil through passage 224a is blocked to increase resistance to the lifting of piston 725. The assembly of valves 310 and 314 functions in the same manner except that relief valve 316 maintains the low pressure in chamber 724 when solenoid S13 is de-energized.

In the event a further description of the foregoing relief valve construction is desired, reference is made to the Vickers Co. Industrial Hydraulics Manual 935100 issued in 1965 by the machinery hydraulics division of Vickers Co. and copyrighted 1965 by Sperry Rand Corp., of Troy, Mich.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of friction welding together two metal workpieces of substantial mass which comprises the steps of relatively rotating said workpieces about an axis and relatively moving said relatively rotating workpieces along said axis and into initial gentle rubbing engagement at the surfaces of regions to be welded together. Immediately subsequent to the commencement of said rubbing engagement materially and abruptly increasing the engagement pressure between said workpieces to at least fifteen hundred pounds per square inch of workpiece area being welded during an initial period of not more than three seconds starting substantially immediately upon initial gentle rubbing engagement of said workpieces, gradually increasing said engagement pressure to a higher level to render the metal in said regions adjacent said surfaces fusible, and stopping said relative rotation.

2. The method defined in claim 1, wherein said engagement pressure is further abruptly increased and maintained for a predetermined period after the relative rotation is stopped.

3. The method defined in claim 2 wherein said further abrupt increase in pressure occurs after said relative rotation is stopped.

4. The method defined in claim 2 wherein said further abrupt increase in pressure occurs prior to the stopping of said relative rotation.

5. The method defined in claim 1 wherein said rotating workpieces are relatively moved toward each other initially at relatively high speed, and wherein said speed is decelerated as said workpieces relatively approach each other and prior to the start of said rubbing engagement to prevent said workpieces from rebounding relative to each other.

6. The method defined in claim 1 wherein the relative movement of said workpieces along said axis is delayed to start only a predetermined period after the relative rotation is imparted to said workpieces.

7. The method defined in claim 1 wherein said abrupt increase in said engagement pressure is provided by blowing relatively high pressure compressible fluid into a chamber substantially immediately when said workpieces contact each other and transmitting the force exerted by the fluid pressure to maintain said workpieces in rubbing engagement with each other.

8. The method defined in claim 7 wherein said force exerted by said compressible fluid to maintain said workpieces in rubbing engagement is transmitted by a relatively incompressible fluid.

9. The method defined in claim 8 wherein said relatively incompressible fluid provides said engagement pressure and is pressurized from a pressure producing source which is separate from said compressible fluid.

10. The method defined in claim 9 comprising the step of applying said incompressible fluid to exponentially compress said compressible fluid for obtaining a resultant pressure which is transmitted to provide for said gradual increase of engagement pressure to said higher level.

11. The method defined in claim 1 wherein said engagement pressure is abruptly increased sufficiently high when said workpieces are brought into rubbing engagement to prevent said workpieces from relatively battering against each other as said engagement pressure is increased.

12. The method defined in claim 11 wherein one of said workpieces is held axially and rotationally stationary and wherein the other of said workpieces is rotated and moved along said axis.

13. The method defined in claim 5 wherein said engagement pressure is initially applied to advance said workpieces relatively toward each other along said axis and wherein said deceleration of the relative movement of said workpieces toward each other is provided by applying a fluid pressure opposing said engagement pressure.

14. An apparatus for friction welding a plurality of metal workpieces to be joined in the form of an integral article comprising means for relatively rotating said workpieces about a predetermined axis, and means for relatively moving said relatively rotating workpieces along said axis and into proximity with one another, characterized by means (a) for slowing the rate of movement of said workpieces along said axis and initially gently engaging said workpieces in rubbing contact at the surface of regions to be welded and for materially and abruptly increasing the engagement pressure between said workpieces to at least 1500 pounds per square inch of workpiece area being welded during an initial period of not more than three seconds starting substantially immediately upon the initial gentle rubbing engagement of said workpieces and (b) for gradually increasing said engagement pressure from its abruptly increased level to a higher level during relative rotation of said workpieces to render the metal in said regions fusible, whereby a weld is formed at said regions when relative rotation of said workpieces is stopped.

15. The apparatus defined in claim 14 wherein the initial increase in said engagement pressure provided by said engagement pressure increasing means is sufficiently high to prevent said workpieces from relatively battering against each other as the engagement pressure is increased during rubbing engagement of said workpieces.

16. The apparatus defined in claim 14 wherein said means for increasing said engagement pressure comprises means providing a source of pressurized relatively compressible fluid, and means for transmitting the force exerted by said pressurized fluid to said workpieces.

17. The apparatus defined in claim 16 wherein said means for transmitting said force comprises hydraulic circuit means containing a relatively incompressible fluid under pressure.

18. The apparatus defined in claim 16 comprising means responsive to the relative movement of said workpieces along said axis for controlling the delivery of said pressurized compressible fluid from a fluid pressure source to prevent the application of said force until said relatively rotating workpieces are brought into rubbing engagement.

19. The apparatus defined in claim 16 comprising means for delivering the incompressible fluid under pressure to said hydraulic circuit means and means for applying the force exerted by said incompressible fluid in said circuit means to provide for the relative movement of said workpieces along said axis.

20. The apparatus defined in claim 19 comprising means in said hydraulic circuit means for controlling the pressure of said incompressible fluid during relative movement of said workpieces along said axis to reduce the speed at which said workpieces are moved relatively toward each other as said workpieces approach rubbing engagement.

21. The apparatus defined in claim 19 wherein said means for transmitting the force exerted by said compressible fluid further comprises first cylinder means receiving first displaceable piston means, means for delivering said compressible fluid to said first cylinder means from a fluid pressure source, second cylinder means forming a part of said hydraulic circuit means and receiving second displaceable piston means, motion transmitting means interconnecting said first and second piston means for transmitting the motion of each piston means to the other, the displacement of said first and second piston means being operative to vary the pressure of the compressible fluid in said first cylinder means and the pressure of the incompressible fluid in said hydraulic circuit means, and means controlling the delivery of said compressible fluid to blow said compressible fluid into said first cylinder means substantially simultaneous with engagement of said workpieces to increase the pressure of said incompressible fluid in said circuit means by applying a pressure increasing force through said first and second piston means.

22. The apparatus defined in claim 21 wherein means are provided in said hydraulic circuit means to increase the pressure of said incompressible fluid sufficiently to displace said first and second piston means in a direction that compresses said compressible fluid in said first cylinder means, the resulting pressure developed in said hydraulic circuit means by compressing said compressible fluid providing for said gradual increase of said engagement pressure.

23. An apparatus for friction welding a plurality of metallic workpieces to be joined in the form of an integral article comprising means mounting said workpieces in spaced apart relation and providing for the displacement of one of said workpieces towards the other along a predetermined axis to move said one workpiece into frictional abutment with the other of said workpieces, means for relatively rotating said workpiece as said one workpiece travels toward said other workpiece, and means for advancing said one workpiece along said axis and into rubbing engagement with said other workpiece during relative rotation of said workpieces to render the workpiece regions in rubbing engagement fusible for forming a weld at said regions when relative rotation of said workpieces is stopped, said workpiece advancing means comprising hydraulic circuit means, means for applying the pressure of pressurized hydraulic fluid in said circuit means to accelerate said one workpiece along said axis and toward said other workpiece, and means controlling the applied pressure of said hydraulic fluid to decelerate said one workpiece as it approaches said other workpiece to prevent rebounding, said means for decelerating said one workpiece comprises means for decreasing the hydraulic fluid pressure acting in a predetermined direction to advance said one workpiece toward said other workpiece and concomitantly providing an increased back pressure opposing said advancement of said one workpiece.

24. The apparatus defined in claim 23 wherein said means for applying the hydraulic fluid pressure comprises cylinder means and piston means received in said cylinder and being displaceable in a predetermined direction by the pressure of hydraulic fluid in said circuit means to impart said acceleration to said one workpiece, and wherein said means for decelerating said one workpiece comprises means for reducing the pressure of said hydraulic fluid that is applied to displace said piston means in said one direction.

25. The apparatus defined in claim 24 wherein said circuit means provides for exhaust of pressurized hydraulic fluid to a low pressure hydraulic circuit section and wherein said decelerating means further comprises means operative concomitantly with said reduction of workpiece-advancing fluid pressure for increasing the exhaust fluid pressure in said circuit section and for applying said increased exhaust fluid pressure in a direction to oppose displacement of said piston means in said predetermined direction.

26. The apparatus defined in claim 24 wherein said deceleration means is responsive to the advancement of said one workpiece to control the opposing fluid pressures acting on said piston means.

27. The apparatus defined in claim 25 wherein said exhaust pressure is applied in said cylinder means to provide a back pressure cushion opposing displacement of said piston means in said predetermined direction.

28. The apparatus defined in claim 23 comprising means responsive to advancement of said one workpiece through a predetermined position approaching said other workpiece for actuating said decelerating means to decelerate said one workpiece.

29. The apparatus defined in claim 28 comprising further means responsive to advancement of said one workpiece through said predetermined position to abruptly increase the fluid pressure applied to advance said piston means in said predetermined direction following a predetermined time delay allowing for deceleration and engagement of said one workpiece with said other workpiece.

30. The apparatus defined in claim 23 comprising time delay means for allowing advancement of said one workpiece along said axis only after said workpieces are relatively rotating for a predetermined time period.

31. An apparatus for friction welding a plurality of metallic workpieces to be joined in the form of an integral article comprising means for mounting said workpieces in spaced apart relation, means for imparting relative rotation to said workpieces, means for moving one of the workpieces into rubbing engagement with the other of said workpieces during relative rotation and for applying pressure along a predetermined axis for maintaining said workpieces in rubbing engagement to render the workpiece regions in rubbing engagement fusible for forming a weld at said regions when relative rotation of said workpieces is stopped, first timing means automatically controlling the time period during which said workpieces are relatively rotated, and second timing means operative independently of said first timing means for automatically controlling the time period during which said engagement pressure is applied along said axis.

32. An apparatus for friction welding first and second workpieces to a third workpiece to form an integral article comprising means mounting the three workpieces in spaced apart relation with respect to each other, means for relatively rotating said first and second workpieces with respect to said third workpiece, and means for moving said first and second workpieces into rubbing engagement with said third workpiece during relative rotation to render the workpiece regions in rubbing engagement fusible for forming a weld when the relative workpiece rotation is stopped, said last-mentioned means comprising first and second hydraulic circuit means each having a pump means for supplying hydraulic fluid under pressure for respectively moving said first and second workpieces toward said third workpiece, at least one of the pump means in said first and second hydraulic circuits having an adjustable displacement to provide for the timed arrival of said first and second workpieces at positions where they are in rubbing engagement with said third workpiece.

33. The method defined in claim 2 wherein said further abrupt increase in pressure occurs substantlly simultaneously with the stopping of said relative rotation.

References Cited

UNITED STATES PATENTS

| | | | |
|---|---|---|---|
| 3,234,645 | 2/1966 | Hollander et al. | 29—470.3 |
| 3,337,108 | 8/1967 | Taylor | 228—2 |
| 3,417,457 | 12/1968 | Burke et al. | 29—470.3 |

JOHN F. CAMPBELL, Primary Examiner

R. J. CRAIG, Assistant Examiner

U.S. Cl. X.R.
156—73; 228—2, 24

PO-1050
(5/69)

UNITED STATES PATENT OFFICE
CERTIFICATE OF CORRECTION

Patent No. 3,548,487  Dated December 22, 1970

Inventor(s) ALEX F. STAMM

It is certified that error appears in the above-identified patent and that said Letters Patent are hereby corrected as shown below:

Column 1, line 5, change the assignee from "Rockwell-Standard Corporation" to -- Rockwell-Standard Company --;
" 1, line 24, change "psindles" to -- spindles --;
" 2, line 16, change "indepednent" to -- independent --;
" 3, line 25, change "uint" to -- unit --;
" 4, line 6, change "numreals" to -- numerals --;
" 4, lines 40 and 41, change "peripheral" to -- periphery --;
" 6, line 57, change "we" to -- well --;
" 7, line 73, change "ot" to -- to --;
" 8, line 31, after "are" insert -- automatically maintained against metal to metal contact as -
" 9, line 6, change "252" to -- 262 --;
" 10, line 51, change "operation" to -- operating --;
" 14, line 18, after "forwardly" insert -- quite --;
" 16, line 58, change "24" to -- 244 --;
" 21, line 10, change "2002" to -- 202 --;
" 24, line 45, change "624" to -- 634 --;
" 26, line 36, change "TR3" to -- TD3 --;
" 26, line 60, change "540" to -- 530 --;
" 27, line 31, change "preveiously" to -- previously --;
" 28, line 26, after "therefore" insert -- open to --;
" 30, line 12, change "time" to -- timer --; and
" 30, line 29, before "returning" insert -- for --.

Signed and sealed this 11th day of May 1971.

(SEAL)
Attest:

EDWARD M. FLETCHER, JR.
Attesting Officer

WILLIAM E. SCHUYLER, JR.
Commissioner of Patents